US012591996B2

(12) United States Patent
Feng et al.

(10) Patent No.: US 12,591,996 B2
(45) Date of Patent: Mar. 31, 2026

(54) VISUAL LOCALIZATION METHOD AND APPARATUS

(71) Applicant: Huawei Technologies Co., Ltd., Shenzhen (CN)

(72) Inventors: Wensen Feng, Shenzhen (CN); Huan Zhang, Shenzhen (CN); Jun Cao, Shenzhen (CN); Jiange Ge, Shenzhen (CN); Zhongwei Tang, Shanghai (CN); Jiangwei Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 580 days.

(21) Appl. No.: 18/070,862

(22) Filed: Nov. 29, 2022

(65) Prior Publication Data

US 2023/0089845 A1 Mar. 23, 2023

Related U.S. Application Data

(63) Continuation of application No. PCT/CN2021/084070, filed on Mar. 30, 2021.

(30) Foreign Application Priority Data

May 31, 2020 (CN) .......................... 202010481150.4

(51) Int. Cl.
G06T 7/73 (2017.01)
G01C 21/00 (2006.01)
(Continued)

(52) U.S. Cl.
CPC ............ *G06T 7/74* (2017.01); *G01C 21/3852* (2020.08); *G06T 7/12* (2017.01); *G06T 11/00* (2013.01);
(Continued)

(58) Field of Classification Search
CPC .. G01C 21/005; G01C 21/28; G01C 21/3602; G01C 21/3852; G06T 2200/24;
(Continued)

(56) References Cited

U.S. PATENT DOCUMENTS

2012/0086727 A1* 4/2012 Korah ........................ G06F 3/03
345/633
2012/0093395 A1 4/2012 Kim et al.
(Continued)

FOREIGN PATENT DOCUMENTS

CN 104809689 A 7/2015
CN 107633041 A 1/2018
(Continued)

OTHER PUBLICATIONS

Cham, Tat-Jen, et al. "Estimating camera pose from a single urban ground-view omnidirectional image and a 2D building outline map." 2010 IEEE Computer Society Conference on Computer Vision and Pattern Recognition. IEEE, 2010. (Year: 2010).*
(Continued)

*Primary Examiner* — Chineyere Wills-Burns
*Assistant Examiner* — Emmanuel Silva-Avina
(74) *Attorney, Agent, or Firm* — Conley Rose, P.C.

(57) ABSTRACT

A visual localization method includes obtaining an image captured by a terminal device; obtaining two-dimensional line feature information of the image that includes at least one of information about a boundary between a building and a non-building or information about a boundary between a non-building and a non-building; and determining a localization pose of the terminal device based on location information of the terminal device, magnetometer angle deflection information of the terminal device, a satellite map, and the two-dimensional line feature information.

19 Claims, 17 Drawing Sheets

(51) Int. Cl.

| | | |
|---|---|---|
| *G06T 7/12* | (2017.01) | |
| *G06T 11/00* | (2006.01) | |
| *H04N 23/60* | (2023.01) | |

(52) U.S. Cl.
CPC .............................. *G06T 2200/24* (2013.01); *G06T 2207/10032* (2013.01); *G06T 2207/20021* (2013.01); *G06T 2207/30184* (2013.01); *G06T 2207/30244* (2013.01); *H04N 23/64* (2023.01)

(58) Field of Classification Search
CPC . G06T 2207/10004; G06T 2207/10032; G06T 2207/20021; G06T 2207/20084; G06T 2207/30184; G06T 2207/30244; G06T 7/12; G06T 7/73; G06T 7/74; H04N 23/64
USPC ........................................................ 382/103
See application file for complete search history.

(56) References Cited

U.S. PATENT DOCUMENTS

| | | | |
|---|---|---|---|
| 2013/0027554 A1 | 1/2013 | Meadow | |
| 2015/0371440 A1 | 12/2015 | Pirchheim et al. | |
| 2020/0003869 A1 | 1/2020 | Yang et al. | |

FOREIGN PATENT DOCUMENTS

| | | | |
|---|---|---|---|
| CN | 109520500 A | 3/2019 | |
| CN | 109752003 A | 5/2019 | |
| CN | 109901207 A | 6/2019 | |
| CN | 110017841 A | 7/2019 | |
| CN | 110858414 A | 3/2020 | |
| CN | 110926474 A | 3/2020 | |
| CN | 111033299 A | 4/2020 | |
| CN | 111143489 A | 5/2020 | |
| CN | 111194015 A | 5/2020 | |
| EP | 2455713 A1 | 5/2012 | |
| KR | 20060130420 A | 12/2006 | |
| KR | 100976138 B1 | 8/2010 | |
| WO | 2012045914 A1 | 4/2012 | |

OTHER PUBLICATIONS

Hofmann, Sabine, Daniel Eggert, and Claus Brenner. "Skyline matching based camera orientation from images and mobile mapping point clouds." (2014). (Year: 2014).*

Bansal, Mayank, and Kostas Daniilidis. "Geometric urban geo-localization." Proceedings of the IEEE Conference on Computer Vision and Pattern Recognition. 2014. (Year: 2014).*

Porzi, Lorenzo, et al. "Learning contours for automatic annotations of mountains pictures on a smartphone." Proceedings of the international conference on distributed smart cameras. 2014. (Year: 2014).*

Arth, Clemens, et al. "Instant outdoor localization and slam initialization from 2.5 d maps." IEEE Transactions on Visualization & Computer Graphics 21.11 (2015): 1309-1318. (Year: 2015).*

Ng, Hoi-Fung, Guohao Zhang, and Li-Ta Hsu. "GNSS NLOS pseudorange correction based on skymask for smartphone applications." Proceedings of the 32nd International Technical Meeting of the Satellite Division of The Institute of Navigation (ION GNSS+ 2019). 2019. (Year: 2019).*

Leung, Keith Yu Kit, Christopher M. Clark, and Jan P. Huissoon. "Localization in urban environments by matching ground level video images with an aerial image." 2008 IEEE international conference on robotics and automation. IEEE, 2008. (Year: 2008).*

Ahmad Touqeer et al., "Comparison of semantic segmentation approaches for horizon/sky line detection", 2017 International Joint Conference on Neural Networks (IJCNN), IEEE, May 14, 2017, pp. 4436-4443, XP033112600.

* cited by examiner (a)                 (b)

Live scene

Virtual object

Cafe >>

Virtual object

Live scene

Virtual character

Virtual animation

Live scene

Virtual animation (a)

(b)

Example of local two-dimensional contour matching

Vertical distance as iterative closest point distance

Horizontal distance as iterative closest point distance

Boundary corresponding to actual values ━━━

Boundary corresponding to a localization result of ----------
a matching manner

Upper boundary of a building (a)            (b)            (c)

VISUAL LOCALIZATION METHOD AND APPARATUS

CROSS-REFERENCE TO RELATED APPLICATIONS

This application is a continuation of International Patent Application No. PCT/CN2021/084070, filed on Mar. 30, 2021, which claims priority to Chinese Patent Application No. 202010481150.4, filed on May 31, 2020. The disclosures of the aforementioned applications are hereby incorporated by reference in their entireties.

TECHNICAL FIELD

The present disclosure relates to an intelligent sensing technology, and in particular, to a visual localization method and apparatus.

BACKGROUND

Visual localization is a way to accurately locate a location and a pose of a camera in the real world by using images or videos captured by the camera. Visual localization is a hot topic in the field of computer vision recently. Visual localization is of great significance in many fields such as augmented reality, interactive virtual reality, robot visual navigation, monitoring in public scenarios, and intelligent transportation.

A visual localization technology includes a satellite map-based visual localization method (geo-localization). A satellite map is obtained by performing white model reconstruction on a scene by using a satellite. In the satellite map-based visual localization method, the satellite map is used to locate an image or a video captured by a camera, to obtain a 6-degree of freedom (DoF) pose of a camera coordinate system in the satellite map. This type of visual localization technology can be used for visual localization of a large scene.

However, the satellite map-based visual localization method has problems of a low localization success rate and low localization accuracy.

SUMMARY

The present disclosure provides a visual localization method and apparatus to improve a success rate and accuracy of localization.

According to a first aspect, an embodiment of the present disclosure provides a visual localization method. The method may include obtaining an image captured by a terminal device; obtaining two-dimensional line feature information of the image, where the two-dimensional line feature information includes at least one of information about a boundary between a building and a non-building or information about a boundary between a non-building and a non-building; and determining a localization pose of the terminal device based on location information and magnetometer angle deflection information of the terminal device, a satellite map, and the two-dimensional line feature information.

In this implementation, visual localization is performed based on the two-dimensional line feature information. The two-dimensional line feature information may include at least one of the information about the boundary between a building and a non-building or the information about the boundary between a non-building and a non-building. This can resolve a problem of a localization failure or low localization accuracy in a scene in which a skyline in a field of view is short or not rich enough. This can improve a success rate and accuracy of visual localization, and can also improve visual localization robustness.

In a possible design, obtaining the two-dimensional line feature information of the image may include performing semantic segmentation on the image to extract the two-dimensional line feature information of the image.

In this implementation, the two-dimensional line feature information of the image is extracted in a semantic segmentation manner so that visual localization is performed based on the two-dimensional line feature information. This can improve a success rate and accuracy of visual localization.

In a possible design, determining the localization pose of the terminal device based on location information and magnetometer angle deflection information of the terminal device corresponding to the image, a satellite map, and the two-dimensional line feature information may include determining a candidate pose set based on the location information and the magnetometer angle deflection information of the terminal device; determining N optimized poses based on the candidate pose set, the two-dimensional line feature information, and the satellite map; and determining the localization pose of the terminal device based on the N optimized poses. N is an integer greater than 1.

In a possible design, the candidate pose set includes M groups of candidate poses. Each group of candidate poses includes candidate location information and a candidate yaw angle set. The candidate location information belongs to a first threshold range. The first threshold range is determined based on the location information of the terminal device. The candidate yaw angle set belongs to a second threshold range. The second threshold range is an angle set determined based on the magnetometer angle deflection information of the terminal device. M is an integer greater than 1.

In a possible design, determining the N optimized poses based on the candidate pose set, the two-dimensional line feature information, and the satellite map includes selecting candidate poses from the candidate pose set, determining panoramic line feature information of the candidate poses based on the candidate poses and the satellite map, matching the panoramic line feature information and the two-dimensional line feature information to determine a plurality of initial poses, and optimizing the plurality of initial poses to determine the N optimized poses.

In this implementation, matching and optimization processing are performed on the candidate poses. This can shorten localization time and improve localization accuracy.

In a possible design, determining the N optimized poses based on the candidate pose set, the two-dimensional line feature information, and the satellite map by using a search method and an iterative method includes step 1: selecting K1 groups of candidate poses from the M groups of candidate poses, and obtaining panoramic line feature information of each group of candidate poses based on candidate location information of each group of the K1 groups of candidate poses and the satellite map; step 2: separately matching the panoramic line feature information of each group of candidate poses and the two-dimensional line feature information, to determine candidate yaw angle information of each group of candidate poses, where the candidate yaw angle information of each group of candidate poses is an angle that is in a candidate yaw angle set of each group of candidate poses and that has a highest degree of matching the two-dimensional line feature information; step 3: obtaining K1 initial poses based on the candidate yaw angle information of the K1 groups of candidate poses, where each initial pose includes candidate location information and candidate yaw angle information of one group of candidate poses; step 4: optimizing the K1 initial poses by using an iterative method, to obtain K1 optimized poses and an iterative closest point loss corresponding to each optimized poses; step 5: determining one optimized pose in the K1 optimized poses as an optimized pose in the N optimized poses based on the iterative closest point loss of each optimized pose, where the one optimized pose is an optimized pose with a smallest iterative closest point loss in the K1 optimized poses; and step 6: replacing K1 with K1+n, and repeatedly performing steps 1 to 5 until the N optimized poses are determined, where n ranges from 1 to N−1, and K1>K2=K3 . . . =KN.

In a possible design, a center of K1+n groups of candidate poses is an optimized pose determined by performing the foregoing steps 1 to 5 on Kn groups of candidate poses.

In a possible design, each initial pose further includes preset height information, preset pitch angle information, and preset roll angle information. Each optimized pose includes location information, height information, yaw angle information, pitch angle information, and roll angle information.

In a possible design, matching the panoramic line feature information and the two-dimensional line feature information includes multimodal robust matching or two-dimensional contour matching. The multimodal robust matching includes multi-semantic information matching or maximum suppression matching.

In this implementation, multimodal robust matching or two-dimensional contour matching can help improve localization effect.

In a possible design, determining the localization pose of the terminal device based on the N optimized poses includes selecting an optimized pose with a smallest loss in the N optimized poses as the localization pose of the terminal device. The loss is a weighted sum of the iterative closest point loss of each optimized pose and a difference corresponding to each optimized pose. The difference is a difference between the location information of each optimized pose and the location information of the terminal device.

In a possible design, the method may further include determining, based on at least one of an interior point percentage, an interior point error, or a heat map corresponding to the localization pose of the terminal device, whether the localization pose of the terminal device is reliable; and if the localization pose of the terminal device is reliable, outputting the localization pose of the terminal device, or if the localization pose of the terminal device is unreliable, determining that localization fails. The heat map indicates distribution of the candidate poses.

In this implementation, whether the localization pose of the terminal device is reliable is determined based on at least one of the interior point percentage, the interior point error, or the heat map corresponding to the localization pose of the terminal device. This can improve credibility of a localization result.

In a possible design, determining, based on at least one of an interior point percentage, an interior point error, or a heat map corresponding to the localization pose of the terminal device, whether the localization pose of the terminal device is reliable includes determining whether the localization pose of the terminal device meets at least one of the following conditions: the interior point percentage corresponding to the localization pose of the terminal device is greater than a first threshold; the interior point error corresponding to the localization pose of the terminal device is less than a second threshold; or a distribution density of the candidate poses in the heat map corresponding to the localization pose of the terminal device is greater than a third threshold.

In a possible design, the method further includes determining virtual object description information based on the localization pose of the terminal device; and sending the virtual object description information to the terminal device, where the virtual object description information is used for displaying a corresponding virtual object on the terminal device.

According to a second aspect, an embodiment of the present disclosure provides a visual localization method. The method may include capturing, by a terminal device, an image, and displaying the image on a user interface of the terminal device, where the image includes at least one of a boundary between a non-building and a non-building that are photographed or a boundary between a building and a non-building that are photographed; sending the image to a server; receiving virtual object description information sent by the server, where the virtual object description information is determined based on a localization pose of the terminal device, the localization pose is determined based on at least two-dimensional line feature information of the image and location information of the terminal device, and the two-dimensional line feature information includes at least one of information about the boundary between a building and a non-building or information about the boundary between a non-building and a non-building; and superimposing and displaying, on the user interface, a virtual object corresponding to the virtual object description information.

In a possible design, prior to capturing an image, the method further includes displaying prompt information on the user interface, where the prompt information prompts a user to photograph at least one of the boundary between a building and a non-building or the boundary between a non-building and a non-building.

In a possible design, prior to capturing an image, the method may further include determining, by using a device model, whether the image is suitable for visual localization.

For example, the image is input into the device model. Semantic segmentation is performed on the image by using the device model. The device model outputs a semantic segmentation result of the image. The two-dimensional line feature information of the image is obtained based on the semantic segmentation result. Whether the image is suitable for visual localization is determined based on the two-dimensional line feature information.

For example, the terminal device performs semantic segmentation on a current query image by using the semantic segmentation device model, extracts a two-dimensional line feature that includes the boundary between a building and a non-building and the boundary between different non-buildings, and determines richness of the two-dimensional line feature. If the two-dimensional line feature is rich, namely, if a length of the two-dimensional line feature is greater than a threshold, the image is suitable for visual localization.

For example, it is determined whether at least one of the boundary between a building and a non-building or the boundary between a non-building and a non-building corresponding to the two-dimensional line feature information is rich. If the boundary is rich, it is determined that the image is suitable for visual localization. If the boundary is not rich, it is determined that the image is not suitable for visual localization.

Richness may mean that a length of the boundary is greater than a threshold. The boundary includes at least one of the boundary between a building and a non-building or the boundary between a non-building and a non-building corresponding to the two-dimensional feature information.

When it is determined that the image is suitable for visual localization, the image may be sent to the server, so that the server performs visual localization on the terminal device based on the image.

It should be noted that accuracy of the two-dimensional line feature information of the image in this implementation is different from accuracy of the two-dimensional line feature information of the image determined based on the foregoing localization pose. The server performs semantic segmentation on the image to obtain the two-dimensional line feature information of the image determined based on the localization pose. The accuracy of the two-dimensional line feature information is higher than that of the two-dimensional line feature information of the image in this implementation.

In this implementation, the terminal device pre-detects the image, and sends the image suitable for visual localization to the server for further accurate visual localization. This can avoid a waste of transmission resources and server-side computing resources caused by sending an image unsuitable for visual localization to the server.

According to a third aspect, an embodiment of the present disclosure provides a visual localization apparatus. The visual localization apparatus may be used as a server or an internal chip of the server. The visual localization apparatus is configured to perform the visual localization method in any one of the first aspect or the possible implementations of the first aspect. Specifically, the visual localization apparatus includes modules or units configured to perform the visual localization method in any one of the first aspect or the possible implementations of the first aspect, for example, a transceiver module or unit and a processing module or unit.

According to a fourth aspect, an embodiment of the present disclosure provides a visual localization apparatus. The visual localization apparatus may be used as a server or an internal chip of the server. The visual localization apparatus includes a memory and a processor. The memory is configured to store instructions. The processor is configured to execute the instructions stored in the memory. In addition, execution of the instructions stored in the memory enables the processor to perform the visual localization method in any one of the first aspect or the possible implementations of the first aspect.

According to a fifth aspect, an embodiment of the present disclosure provides a computer-readable storage medium. The computer-readable storage medium stores a computer program. When the program is executed by a processor, the method in any one of the first aspect or the possible implementations of the first aspect is implemented.

According to a sixth aspect, an embodiment of the present disclosure provides a visual localization apparatus. The visual localization apparatus may be used as a terminal device or an internal chip of the terminal device. The visual localization apparatus is configured to perform the visual localization method in any one of the second aspect or the possible implementations of the second aspect. Specifically, the visual localization apparatus may include modules or units configured to perform the visual localization method in any one of the second aspect or the possible implementations of the second aspect, for example, a transceiver module or unit and a processing module or unit.

According to a seventh aspect, an embodiment of the present disclosure provides a visual localization apparatus. The visual localization apparatus may be used as a terminal device or an internal chip of the terminal device. The visual localization apparatus includes a memory and a processor. The memory is configured to store instructions. The processor is configured to execute the instructions stored in the memory. In addition, execution of the instructions stored in the memory enables the processor to perform the visual localization method in any one of the second aspect or the possible implementations of the second aspect.

According to an eighth aspect, an embodiment of the present disclosure provides a computer-readable storage medium. The computer-readable storage medium stores a computer program. When the program is executed by a processor, the method in any one of the second aspect or the possible implementations of the second aspect is implemented.

According to a ninth aspect, an embodiment of the present disclosure provides a computer program product. The computer program product includes a computer program. When being executed by a computer or a processor, the computer program is used for performing the method in any one of the first aspect or the possible implementations of the first aspect, or is used for performing the method in any one of the second aspect or the possible implementations of the second aspect, or is used for performing the method in any one of the third aspect or the possible implementations of the third aspect.

According to the visual localization method and apparatus in embodiments of the present disclosure, the server obtains the two-dimensional line feature information of the image captured by the terminal device, where the two-dimensional line feature information includes at least one of the information about the boundary between a building and a non-building or the information about the boundary between a non-building and a non-building; and determines the localization pose of the terminal device based on the location information and the magnetometer angle deflection information of the terminal device, the satellite map, and the two-dimensional line feature information. Visual localization is performed based on the two-dimensional line feature information. This can resolve a problem of a localization failure or low localization accuracy in a scene in which a skyline in a field of view is short or not rich enough. This can improve a success rate and accuracy of visual localization, and can also improve visual localization robustness.

BRIEF DESCRIPTION OF DRAWINGS

FIG. 9A-1 and FIG. 9A-2 show a schematic diagram of a processing process of a visual localization method according to an embodiment of the present disclosure;

DESCRIPTION OF EMBODIMENTS

Terms such as "first" and "second" in embodiments of the present disclosure are only used for distinguishing and description, but cannot be understood as an indication or implication of relative importance, or an indication or implication of an order. In addition, the terms "include", "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

It should be understood that in the present disclosure, "at least one (item)" refers to one or more, and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof represents any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

Some terms in embodiments of the present disclosure are described, to facilitate understanding of a visual localization method in embodiments of the present disclosure.

Visual localization: To seamlessly integrate the real world with the virtual world, a conversion relationship between a camera coordinate system of a terminal device and a three-dimensional coordinate system of the real world is calculated by using an algorithm, so that a virtual object in the real world is displayed on the terminal device. A problem to be resolved by a visual localization technology is how to accurately locate a location and a pose of a camera in the real world by using images or videos captured by the camera.

A query image is an RGB image or a picture sequence that is collected by a terminal device and that is used to implement visual localization.

The terms "picture", "frame", or "image" may be used as synonyms.

Figure 1:
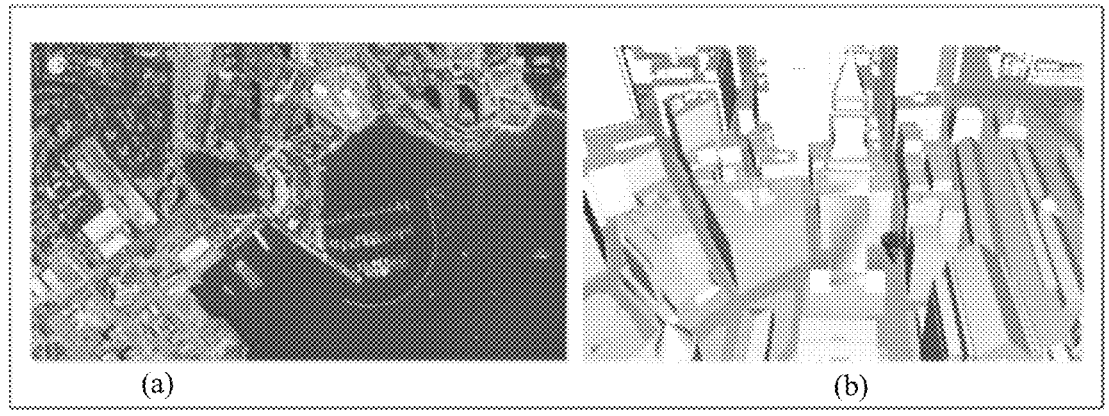
FIG. 1 is a schematic diagram of a satellite map according to an embodiment of the present disclosure.

A satellite map is a map obtained by performing white model reconstruction (as shown in FIG. 1(*b*)) on a scene based on a satellite image (as shown in FIG. 1(*a*)).

Satellite map-based visual localization (Geo-localization): A pose of a camera coordinate system of a terminal device in a satellite map is located based on the satellite map.

A pose may include a location and a posture. The location may include (x, y, z) coordinates. The posture may include angle deflection around the three coordinate axes. The angle deflection around the three coordinate axes includes a yaw angle, a pitch angle, and a roll angle. A pose including (x, y, z) coordinates, a yaw angle, a pitch angle, and a roll angle may also be referred to as a 6-DoF pose.

Panoramic line feature information of a pose (e.g., a candidate pose or a localization pose): Panoramic line feature information of a satellite map corresponding to the pose (e.g., the candidate pose or the localization pose) is extracted based on the satellite map. The panoramic line feature information may include at least one of information about a boundary between a building and a non-building or information about a boundary between a non-building and a non-building that is corresponding to the pose (e.g., the candidate pose or the localization pose).

Embodiments of the present disclosure relate to a terminal device. The terminal device may be a mobile phone, a smartphone, a tablet personal computer, a media player, a smart television, a laptop computer, a personal digital assistant (PDA), a personal computer, a smartwatch, a wearable device such as augmented reality (AR) glasses, a vehiclemounted device, an internet of things (IoT) device, or the like. This is not limited in embodiments of the present disclosure.

Figure 2:
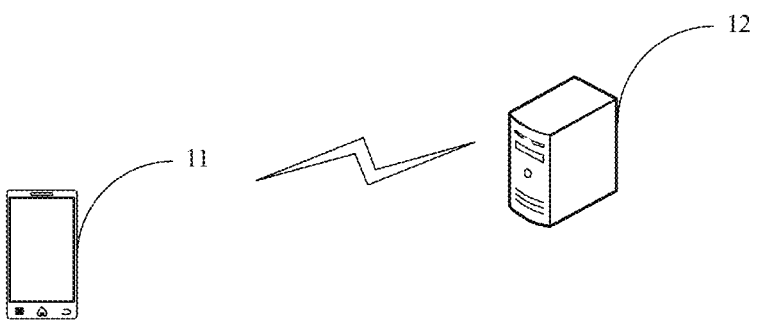
FIG. 2 is a schematic diagram of an application scenario according to an embodiment of the present disclosure.

FIG. 2 is a schematic diagram of an application scenario according to an embodiment of the present disclosure. As shown in FIG. 2, the application scenario may include a terminal device 11 and a server 12. For example, the terminal device 11 may communicate with the server 12, and the server 12 may provide a visual localization service for the terminal device, and push virtual object description information to the terminal device 11 based on the visual localization service, so that the terminal device can present a corresponding virtual object. The virtual object may be a virtual road sign, a virtual character, or the like. An embodiment of the present disclosure provides a visual localization method, to improve a success rate and accuracy of visual localization. In this way, corresponding virtual object description information is accurately pushed to a terminal device. For specific descriptions of the visual localization method, refer to the following embodiments.

Figure 3A:
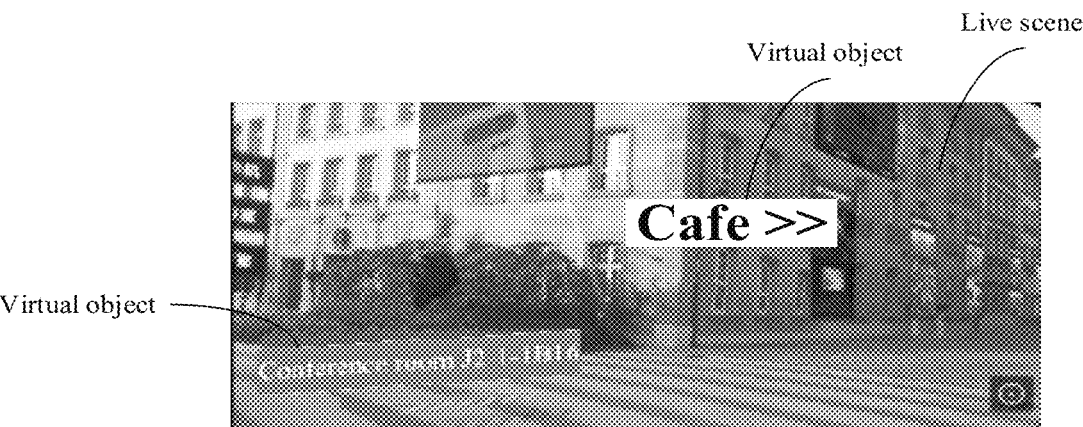
FIG. 3A is a schematic diagram of a user interface displayed on a screen of a terminal device according to an embodiment of the present disclosure.
Figure 3B:
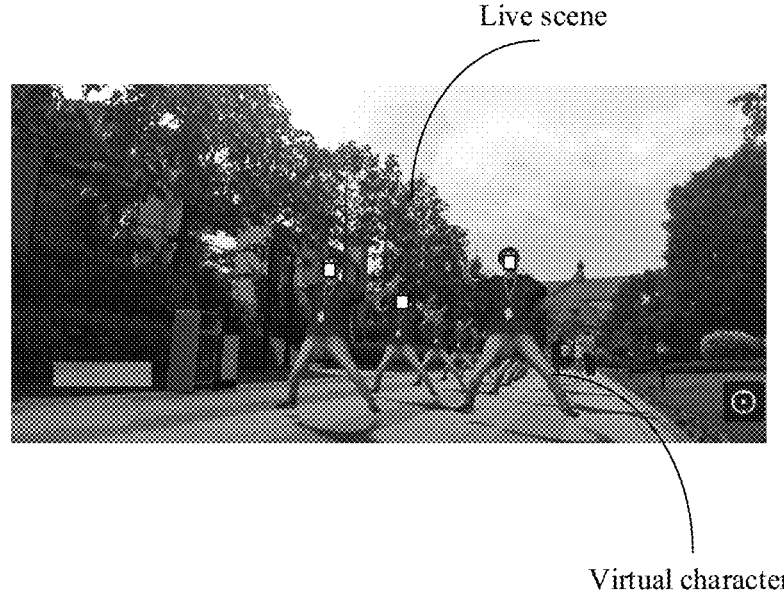
FIG. 3B is a schematic diagram of a user interface displayed on a screen of a terminal device according to an embodiment of the present disclosure.
Figure 3C:
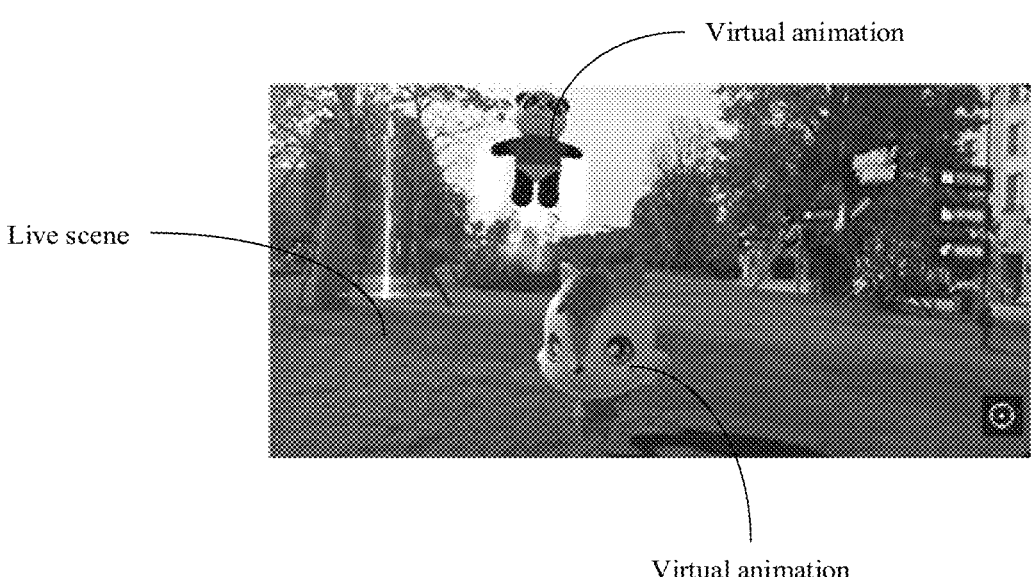
FIG. 3C is a schematic diagram of a user interface displayed on a screen of a terminal device according to an embodiment of the present disclosure.

The visual localization method in this embodiment of the present disclosure may be applied to fields in which a location and a pose of a camera of a terminal device need to be determined, such as AR navigation, AR human-computer interaction, assisted driving, and self-driving. For example, in an extra-large scene visual navigation system, visual navigation is guiding a user to a specific destination through interaction such as augmented reality. The user may see information such as a suggested walking direction and a distance from a destination on a screen of the terminal device in real time. As shown in FIG. 3A, a virtual object is a walking direction to the conference room J2-1-1B16 displayed on the screen. In other words, the walking direction and the like are displayed to the user through augmented reality. For another example, for extra-large scene AR game interaction shown in FIG. 3B and FIG. 3C, AR content may be displayed at a specific fixed geographical location during AR game interaction, and corresponding virtual objects (e.g., virtual characters shown in FIG. 3B or virtual animations shown in FIG. 3C) may be displayed on the screen of the terminal device of the user by using the visual localization method in this embodiment of the present disclosure. The user may guide the virtual objects to interact with the real world by interacting with the virtual objects through tapping/sliding on the screen of the terminal device.

It should be noted that a camera lens is usually disposed on the terminal device 11, and the terminal device 11 may photograph a scene by using the camera lens. Descriptions are provided by using an example in which the server 12 is one server. This is not limited in the present disclosure. For example, the server 12 may alternatively be a server cluster including a plurality of servers.

Figure 4:
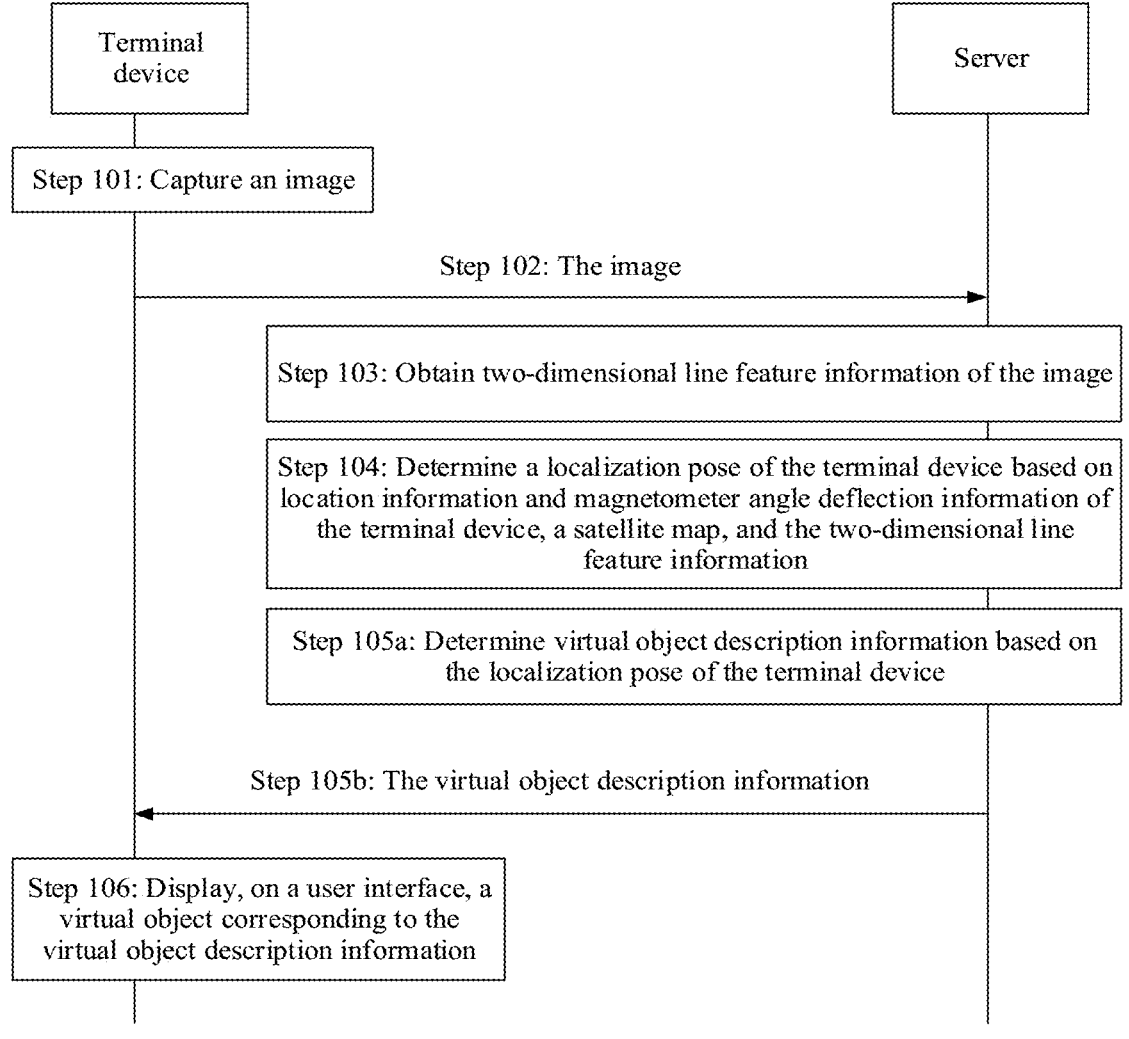
FIG. 4 is a flowchart of a visual localization method according to an embodiment of the present disclosure.

FIG. 4 is a flowchart of a visual localization method according to an embodiment of the present disclosure. The method in this embodiment uses a terminal device and a server. As shown in FIG. 4, the method in this embodiment may include the following steps.

Step 101: The terminal device captures an image.

The terminal device captures the image by using a camera lens. The image may be the foregoing described query image.

For example, the terminal device is a smartphone. The smartphone may start a photographing function by triggering an application program, to capture the image. For example, images may be captured periodically, for example, every 2 seconds or every 30 seconds, or the images may be captured when a preset capture condition is met. The preset capture condition may be that GPS data of the smartphone falls within a preset range. The following steps may be performed for one or more images captured by the terminal device, to implement visual localization.

When capturing the image, the terminal device may also capture location information and magnetometer angle deflection information of the terminal device. For specific descriptions of the location information and the magnetometer angle deflection information of the terminal device, refer to related descriptions in step 104.

Step 102: The terminal device sends the image to the server.

The server receives the image sent by the terminal device.

In some embodiments, when sending the image, the terminal device may also send the location information and the magnetometer angle deflection information of the terminal device to the server. In some embodiments, after sending the image, the terminal device may send the location information and the magnetometer angle deflection information of the terminal device corresponding to the image.

Step 103: The server obtains two-dimensional line feature information of the image based on the image.

Figure 5:
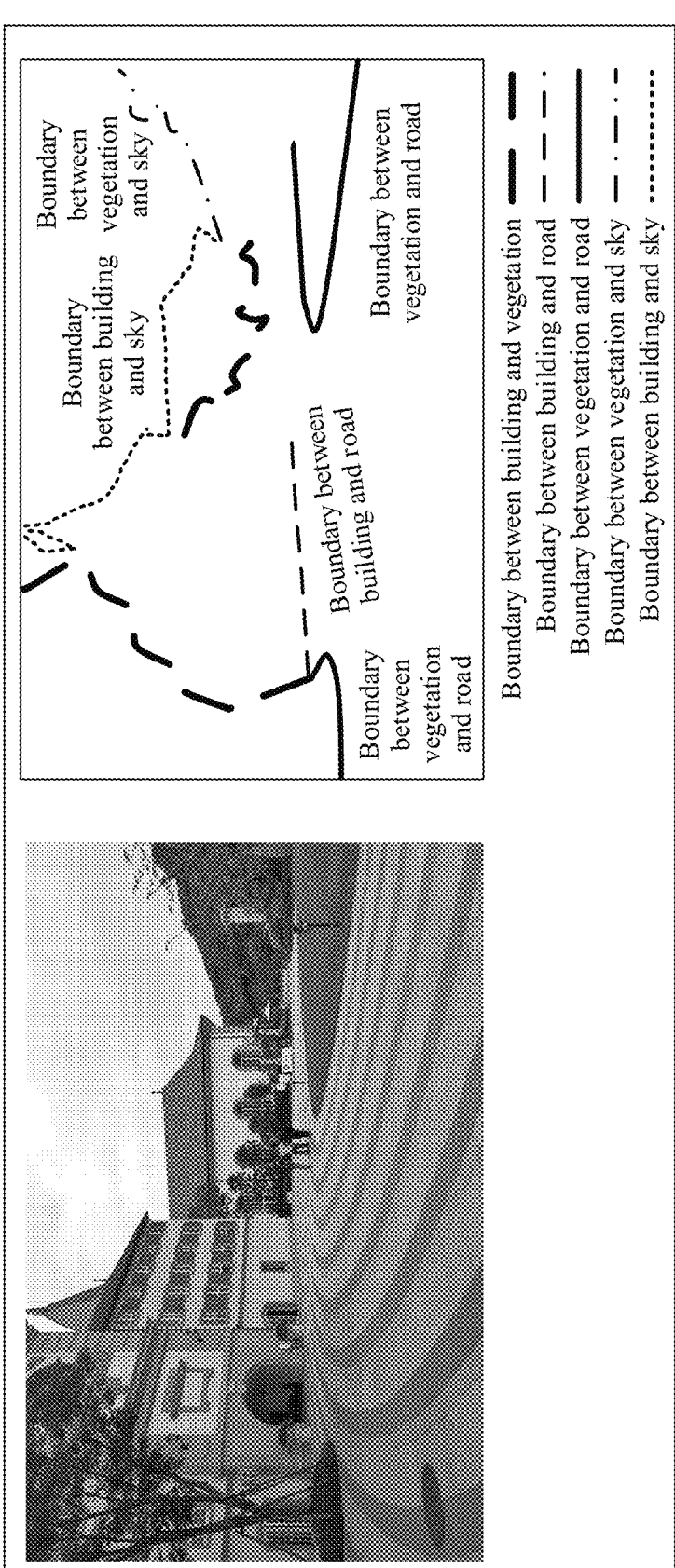
FIG. 5 is a schematic diagram of two-dimensional line feature information of an image according to an embodiment of the present disclosure.

The two-dimensional line feature information may include at least one of information about a boundary between a building and a non-building or information about a boundary between a non-building and a non-building. The building may include a residential building, an office building, a stadium, an exhibition hall, a hospital, or the like. The non-building may include vegetation, sky, water surface (e.g., a lake surface, a river surface, or a sea surface), ground, or the like. For example, the information about the boundary between a building and a non-building may be information about a boundary between building and tree, information about a boundary between building and ground (also referred to as lower edge information of a building), information about a boundary between building and sky (also referred to as upper edge information of a building), or the like. The information about the boundary between different non-buildings may be information about a boundary between road and river surface, between road and vegetation, between road and sidewalk, or between different roads. The information about the boundary between a non-building and a road may also be referred to as boundary information of the road. As shown in FIG. 5, for example, the image is an image shown on the left side in FIG. 5. The image includes building, road, vegetation, and sky. The obtained two-dimensional line feature information of the image may be information about a boundary between building and vegetation, a boundary between vegetation and road, a boundary between building and road, a boundary between building and sky, and a boundary between vegetation and sky that are shown on the right side in FIG. 5. Images captured by the terminal device in different scenarios may include a building and/or a non-building, and the like. For images with different imaging content, different two-dimensional line feature information of the images is obtained by the server.

The information about the boundary between a building and a non-building and the information about the boundary between a non-building and a non-building may be referred to as two-dimensional line feature information of different categories. In some embodiments, the server may determine a category of the two-dimensional line feature information of the image based on the location information of the terminal device or based on the location information and the magnetometer angle deflection information of the terminal device, and further obtain the two-dimensional line feature information of the corresponding category of the image. For example, a user uses the terminal device to capture an image in an urban street, and sends the image to the server. The server may determine a category of the two-dimensional line feature information of the image based on the location information of the terminal device. The category of the two-dimensional line feature information includes the information about the boundary between a building and a non-building and the information about the boundary between a non-building and a non-building. The server may further obtain the information about the boundary between a building and a non-building and the information about the boundary between a non-building and a non-building in the image. For another example, a user uses the terminal device to capture an image by a riverside, and sends the image to the server. The server may determine a category of the two-dimensional line feature information of the image based on the location information and the magnetometer angle deflection information of the terminal device. The category of the two-dimensional line feature information includes the information about the boundary between a building and a non-building and the information about the boundary between a non-building and a non-building. The server may further obtain the information about the boundary between a building and a non-building and the information about the boundary between a non-building and a non-building in the image.

In some embodiments, the server may perform semantic segmentation on the image to extract the two-dimensional line feature information of the image. For example, semantic segmentation of different categories (e.g., vegetation, building, sky, water surface, and ground) is performed on the image, and the two-dimensional line feature information of the image is extracted.

Semantic segmentation may be specifically implemented in a plurality of manners. For example, a semantic segmentation model performs semantic segmentation, to output the two-dimensional line feature information of the image. For example, the semantic segmentation model may be any neural network model, for example, a deep neural network (DNN), a convolutional neural network (CNN), or a combination thereof. The semantic segmentation model may alternatively be any machine learning classifier, for example, a support vector machine (SVM) classifier.

The semantic segmentation model may perform semantic segmentation on an input image, to distinguish building contour, sky, vegetation, ground, water surface, or the like, and further output the two-dimensional line feature information of the image. Semantic segmentation may be a dense pixel-level classification task. The semantic segmentation model may be obtained through training by using training images and label values (for indicating categories corresponding to pixels, for example, building or sky). For example, a training policy used during training may be a standard cross entropy loss, and is used to measure a difference between a predicted value and a label value of the semantic segmentation model. Prediction effect of the semantic segmentation model is improved by minimizing the cross entropy loss. The semantic segmentation model finally obtained through training can distinguish between the boundary between a building and a non-building and/or the boundary between a non-building and a non-building in the image, and the like.

Step 104: The server determines a localization pose of the terminal device based on the location information and the magnetometer angle deflection information of the terminal device, a satellite map, and the two-dimensional line feature information.

The location information may be satellite localization information of the terminal device, for example, Global Positioning System (GPS) information of the terminal device, BeiDou navigation satellite system (BDS) information of the terminal device, global navigation satellite system (GLONASS) information of the terminal device, or Galileo satellite navigation system information of the terminal device. The magnetometer angle deflection information may be a yaw angle. The location information and the magnetometer angle deflection information may be location information and magnetometer angle deflection information that are obtained when the terminal device captures the image, and may be obtained by a wireless communication module and a magnetometer of the terminal device.

The server may determine a plurality of candidate poses based on the location information and the magnetometer angle deflection information of the terminal device, extract panoramic line feature information of each candidate pose based on the satellite map, and determine the localization pose of the terminal device based on the panoramic line feature information of each candidate pose and the two-dimensional line feature information, to determine the localization pose of the terminal device based on the two-dimensional line feature information of the image. This improves a success rate and accuracy of localization.

For example, the server may determine a candidate pose set based on the location information and the magnetometer angle deflection information of the terminal device. The candidate pose set may include a plurality of groups of candidate poses. Each group of candidate poses includes candidate location information and a candidate yaw angle set. The candidate location information is determined based on the location information of the terminal device. For example, the server may determine a candidate location range based on the location information of the terminal device. The candidate location information belongs to the candidate location range. The candidate location range may be a circular area range with a specific radius (e.g., 30 meters) by using the location information of the terminal device as a circle center. For another example, the server may determine the candidate yaw angle set based on the magnetometer angle deflection information of the terminal device. For example, the candidate yaw angle set may be a yaw angle set within a range of plus or minus 90 degrees from the magnetometer angle deflection information of the terminal device. The server may determine N optimized poses based on the candidate pose set, the two-dimensional line feature information, and the satellite map. The localization pose of the terminal device is determined based on the N optimized poses. N is an integer greater than 1.

In an implementation, the server may determine the N optimized poses based the candidate pose set, the two-dimensional line feature information, and the satellite map by using a search method and an iterative method. The search method is used to select candidate poses from the candidate pose set, determine panoramic line feature information of the candidate poses based on the candidate poses and the satellite map, and match the panoramic line feature information and the two-dimensional line feature information to determine a plurality of initial poses. The iterative method is used to optimize the plurality of initial poses to determine the N optimized poses.

The search method may be used to select the panoramic line feature information of the candidate poses to match the two-dimensional line feature information. This can shorten time for determining the localization pose of the terminal device, namely, localization time. For example, the search method may be used to search the candidate pose set several times to determine the N optimized poses. For example, N searches are performed to determine the N optimized poses.

For example, N searches are performed to determine the N optimized poses. During a first search, the server may select panoramic line feature information of candidate poses from the candidate pose set to match two-dimensional line feature information, and determine an optimized pose by using the iterative method. During a second search, the server selects, from the candidate pose set, panoramic line feature information of candidate poses near the optimized pose determined during the first search to match the two-dimensional line feature information, and determine an optimized pose by using the iterative method. The rest can be deduced by analogy. The search method and the iterative method are repeatedly performed until the N optimized poses are determined.

The iterative method may be an iterative closest point (ICP) algorithm. The iterative method may be used to optimize the initial poses obtained through matching, to obtain the optimized poses. This can improve accuracy of the finally determined localization pose.

Optionally, the server may select an optimized pose with a smallest loss in the N optimized poses as the localization pose of the terminal device. The loss includes a difference between location information of each optimized pose and the location information of the terminal device, and an iterative closest point loss (ICP loss) of each optimized pose.

The loss of the optimized pose is used as an example. The loss of the optimized pose may be obtained through weighted summation of the difference between the location information of the optimized pose and the location information of the terminal device and the iterative closest point loss of the optimized pose. For example, the loss of the optimized pose is equal to a1*the difference between the location information of the optimized pose and the location information of the terminal device+a2*the iterative closest point loss of the optimized pose. Specific values of a1 and a2 may be flexibly specified based on a requirement.

The iterative closest point loss corresponding to the optimized pose is an iterative closest point loss obtained by matching the two-dimensional line feature information and panoramic line feature information that is of the optimized pose and that is extracted based on the satellite map.

Step 105a: The server determines virtual object description information based on the localization pose of the terminal device.

For example, the server may determine the virtual object description information based on the localization pose. The virtual object description information is used for displaying a corresponding virtual object on the terminal device, for example, a walking guide icon shown in FIG. 3A. The guide icon is displayed in an actual scenario in the real world, namely, on the street shown in FIG. 3A.

Step 105b: The server sends the virtual object description information to the terminal device.

Step 106: The terminal device displays, on a user interface, the virtual object corresponding to the virtual object description information.

The terminal device displays, on the user interface, the virtual object corresponding to the virtual object description information. The actual scenario in the real world is displayed on the user interface. The virtual object may be displayed on the user interface through augmented reality.

In this embodiment, the server obtains the two-dimensional line feature information of the image captured by the terminal device, where the two-dimensional line feature information may include at least one of the information about the boundary between a building and a non-building or the information about the boundary between a non-building and a non-building; and determines the localization pose of the terminal device based on the location information and the magnetometer angle deflection information of the terminal device, the satellite map, and the two-dimensional line feature information. Visual localization is performed based on the two-dimensional line feature information. This can resolve a problem of a localization failure or low localization accuracy in a scene in which a skyline in a field of view is short or not rich enough. This can improve a success rate and accuracy of visual localization, and can also improve visual localization robustness.

Figure 6:
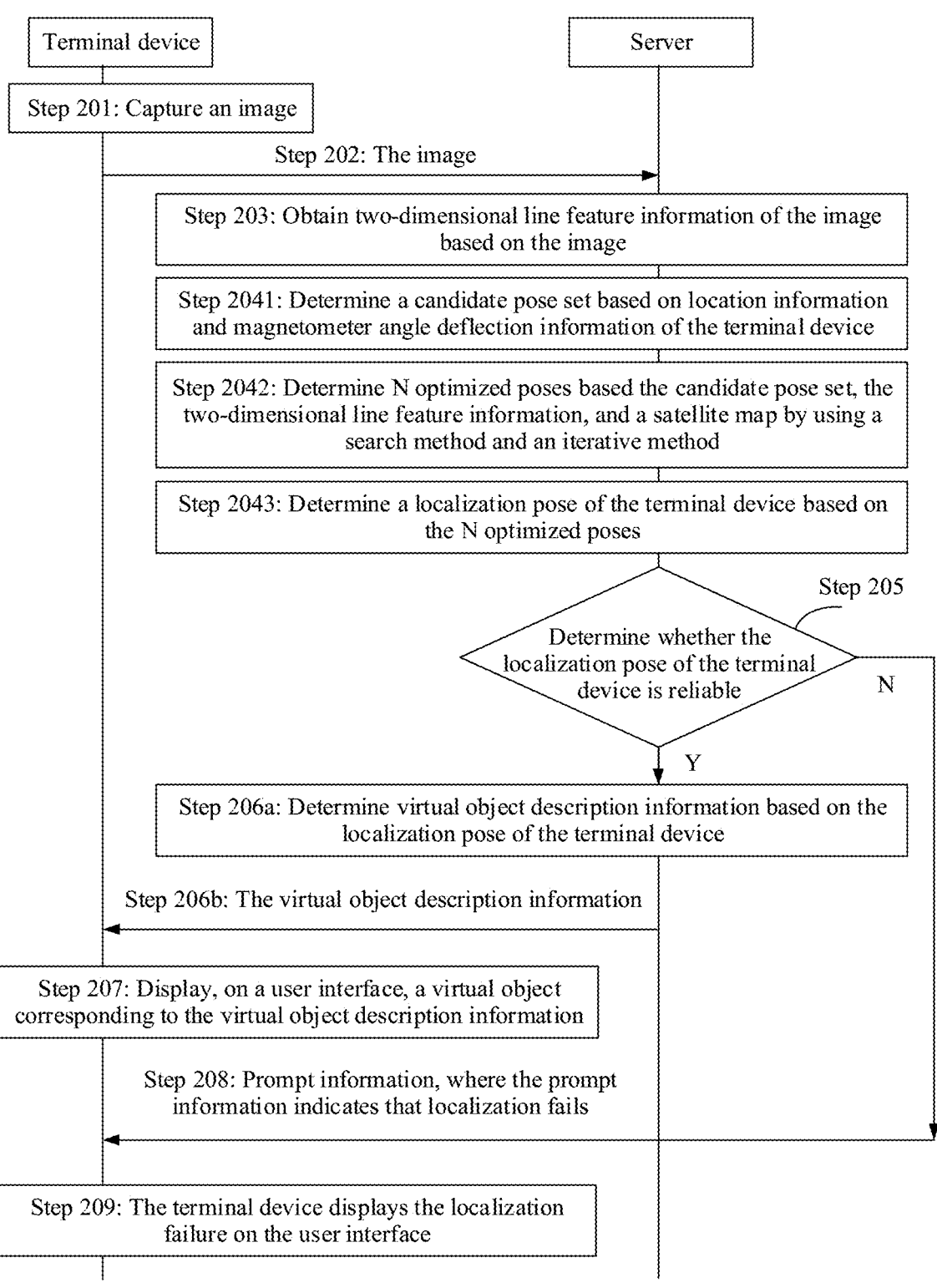
FIG. 6 is a flowchart of a visual localization method according to an embodiment of the present disclosure.

FIG. 6 is a flowchart of a visual localization method according to an embodiment of the present disclosure. The method in this embodiment uses a terminal device and a server. Based on the embodiment in FIG. 4, in this embodiment, after a localization pose of the terminal device is determined, whether the localization pose is reliable is further determined. This improves credibility of a localization result. As shown in FIG. 6, the method in this embodiment may include the following steps.

Step 201: The terminal device captures an image.

Step 202: The terminal device sends the image to the server.

Step 203: The server obtains two-dimensional line feature information of the image based on the image.

For descriptions of step 201 to step 203, refer to step 101 to step 103 in the embodiment shown in FIG. 4. Details are not described herein again.

Step 2041: The server determines a candidate pose set based on location information and magnetometer angle deflection information of the terminal device.

Step 2042: The server determines N optimized poses based the candidate pose set, the two-dimensional line feature information, and a satellite map by using a search method and an iterative method.

The search method is used to select candidate poses from the candidate pose set, and match panoramic line feature information of the selected candidate poses with the two-dimensional line feature information to determine a plurality of initial poses. The iterative method is used to optimize the plurality of initial poses, and determine the N optimized poses.

Step 2043: The server determines the localization pose of the terminal device based on the N optimized poses.

For descriptions of step 2041 to step 2043, refer to step 104 in the embodiment shown in FIG. 4. Details are not described herein again.

Step 205: The server determines, based on at least one of an interior point percentage, an interior point error, or a heat map corresponding to the localization pose of the terminal device, whether the localization pose of the terminal device is reliable; and if the localization pose of the terminal device is reliable, performs step 206a, or if the localization pose of the terminal device is unreliable, performs step 208.

The heat map indicates distribution of location information of the N optimized poses in the candidate location set. The interior point percentage and the interior point error are used to describe a degree to which panoramic line feature information of the localization pose of the terminal device matches the two-dimensional line feature information based on satellite localization. An interior point is a point whose difference between the two-dimensional line feature information and the panoramic line feature information of the localization pose of the terminal device is less than L1, and L1 may be any positive integer less than 10, 5, or 4. The interior point percentage refers to a percentage of a total quantity of points whose difference is less than L1 to a total quantity of points in the two-dimensional line feature information. The interior point error refers to a difference average value of the points whose difference is less than L1.

Figure 7A:
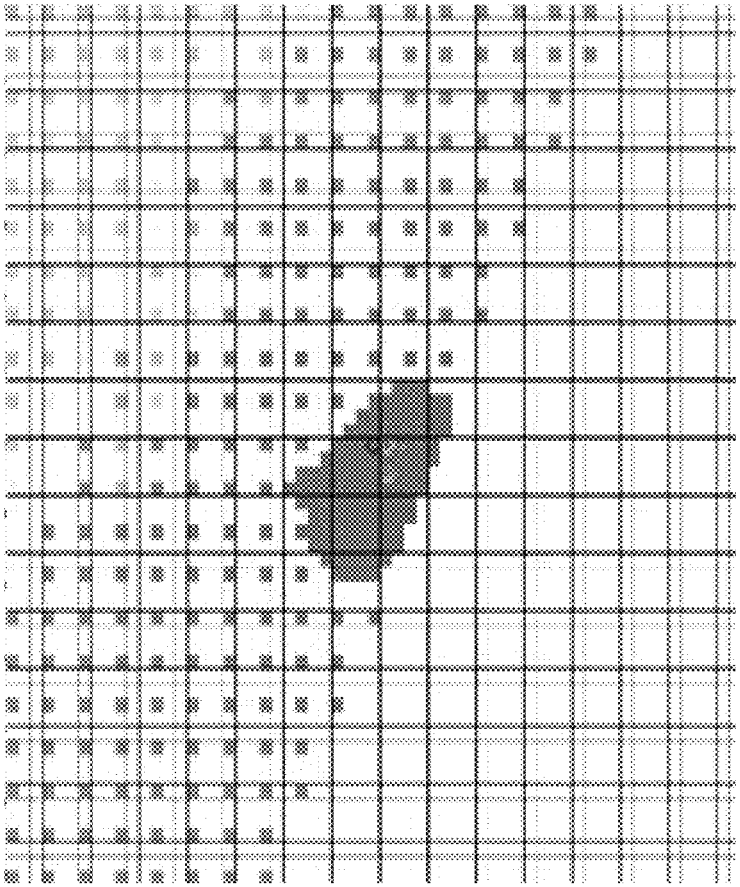
FIG. 7A is a schematic diagram of a heat map according to an embodiment of the present disclosure.

For example, an embodiment of the present disclosure provides a schematic diagram of a heat map. As shown in FIG. 7A, a center of the heat map is a point at which the location information of the terminal device is located. Each solid square point in the figure represents a point processed by using the foregoing search method and iterative method.

In some embodiments, the server may determine whether the localization pose of the terminal device meets at least one of the following conditions: the interior point percentage corresponding to the localization pose of the terminal device is greater than a first threshold; the interior point error corresponding to the localization pose of the terminal device is less than a second threshold; or a distribution density of the candidate poses in the heat map corresponding to the localization pose of the terminal device is greater than a third threshold. Values of the first threshold, the second threshold, and the third threshold may be any positive numbers, and may be flexibly specified based on a requirement.

If the interior point percentage corresponding to the localization pose of the terminal device is greater than the first threshold, or the interior point error corresponding to the localization pose of the terminal device is less than the second threshold, it may indicate that the localization pose of the terminal device is similar to and matches the two-dimensional line feature information. If the distribution density of the candidate poses in the heat map corresponding to the localization pose of the terminal device is greater than the third threshold, it may indicate that the candidate poses selected from the candidate pose set in the search method are centralized, so that the localization pose finally determined through a plurality of searches is accurate. The heat map shown in FIG. 7A is further used as an example for description. It may be learned from FIG. 7A that distribution of candidate poses in the heat map is centralized, and it may be determined that the localization pose is reliable.

In other words, if the localization pose of the terminal device has a high interior point percentage and/or a small interior point error, the localization pose of the terminal device is reliable or credible. On the contrary, if the localization pose of the terminal device has a low interior point percentage and/or a large interior point error, the localization pose of the terminal device is unreliable or not credible. If distribution of the candidate poses in the heat map corresponding to the localization pose of the terminal device is centralized, the localization pose of the terminal device is reliable or credible. On the contrary, if distribution of the candidate poses in the heat map corresponding to the localization pose of the terminal device is scattered, the localization pose of the terminal device is unreliable or not credible.

Figure 7B:
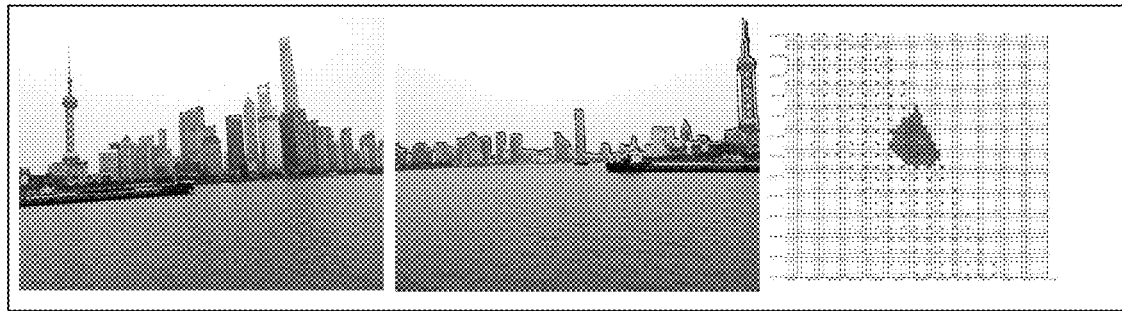
FIG. 7B is a schematic diagram of determining whether a localization pose of a terminal device is reliable or credible according to an embodiment of the present disclosure.

For example, the server determines, based on the interior point percentage, the interior point error, and the heat map, that the localization pose of the terminal device is reliable or credible. As shown in FIG. 7B, an image shown on the left side in FIG. 7B is the image captured by the terminal device. An image shown in the middle shows the panoramic line feature information of the localization pose of the terminal device and the two-dimensional line feature information of the image, namely, each boundary. A boundary between building and sky is used as an example. A boundary between building and sky based on a localization satellite and a boundary between building and sky based on the image are shown in the middle in FIG. 7B. In view of this, the interior point percentage and the interior point error may be calculated. Then, with reference to the heat map shown on the right side in FIG. 7B, it is finally determined that the localization pose of the terminal device is reliable or credible.

Step 206a: The server determines virtual object description information based on the localization pose of the terminal device.

Step 206b and step 207 may be performed after step 206a is performed.

Step 206b: The server sends the virtual object description information to the terminal device.

Step 207: The terminal device displays, on a user interface, the virtual object corresponding to the virtual object description information.

Step 208: The server sends prompt information to the terminal device, where the prompt information indicates that localization fails.

The prompt information further indicates to re-capture an image.

Step 209: The terminal device displays the localization failure on the user interface.

The terminal device may further display, on the user interface, information prompting a user to re-capture an image.

In this embodiment, the server obtains the two-dimensional line feature information of the image captured by the terminal device, where the two-dimensional line feature information may include at least one of information about a boundary between a building and a non-building or information about a boundary between a non-building and a non-building; determines the localization pose of the terminal device based on the location information and the magnetometer angle deflection information of the terminal device, the satellite map, and the two-dimensional line feature information; determines, based on at least one of the interior point percentage, the interior point error, or the heat map corresponding to the localization pose of the terminal device, whether the localization pose of the terminal device is reliable; and if the localization pose of the terminal device is reliable, outputs the localization pose of the terminal device, or if the localization pose of the terminal device is unreliable, determines that localization fails. Visual localization is performed based on the two-dimensional line feature information. This can resolve a problem of a localization failure or low localization accuracy in a scene in which a skyline in a field of view is short or not rich enough. This can improve a success rate and accuracy of visual localization, and can also improve visual localization robustness. Further, whether the localization pose of the terminal device is reliable is determined based on at least one of the interior point percentage, the interior point error, or the heat map corresponding to the localization pose of the terminal device. This can improve credibility of a localization result.

Figure 8A:
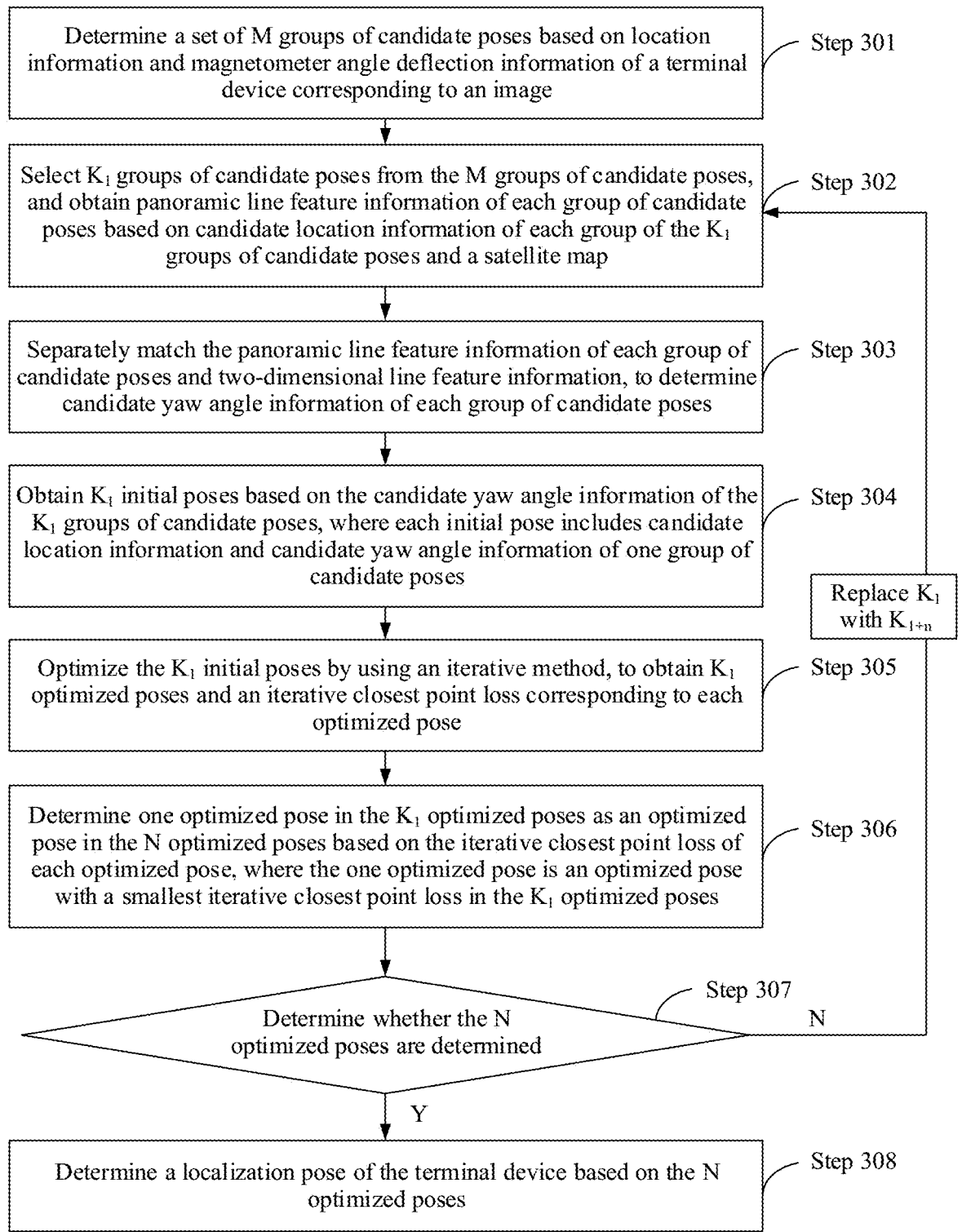
FIG. 8A is a flowchart of a robust satellite map-based visual localization (geo-localization) method according to an embodiment of the present disclosure.

The following describes a specific implementation of step 104 by using an embodiment shown in FIG. 8A.

FIG. 8A is a flowchart of a robust satellite map-based visual localization (Geo-localization) method according to an embodiment of the present disclosure. This embodiment may be performed by a server or an internal chip of the server. As shown in FIG. 8A, the method in this embodiment may include the following steps.

Step 301: Determine a set of M groups of candidate poses based on location information and magnetometer angle deflection information of a terminal device corresponding to an image.

Each group of candidate poses includes candidate location information and a candidate yaw angle set. The candidate location information belongs to a first threshold range. The first threshold range is determined based on the location information of the terminal device. The candidate yaw angle set belongs to a second threshold range. The second threshold range is an angle set determined based on the magnetometer angle deflection information of the terminal device. M is an integer greater than 1.

For example, the terminal device may separately construct a candidate location set (T) and a candidate yaw angle set (Y) based on the location information and the magnetometer angle deflection information of the terminal device corresponding to the image. The candidate location set (T) includes a plurality of pieces of candidate location information. The candidate yaw angle set (Y) includes a plurality of yaw angles. One piece of candidate location information in T and the candidate yaw angle set (Y) may form a group of candidate poses. Therefore, a plurality of groups of candidate poses may be formed.

The candidate location set (T) is constructed as follows. In an area range, a location point is selected as candidate location information in the candidate location set (T) at an interval of a first preset interval. The area range may be an area range with a radius of a fourth threshold by using the location information (x, y) of the terminal device corresponding to the image as a circle center. In other words, a central value of the first threshold range is the location information of the terminal device. For example, the fourth threshold may be 30 meters or 35 meters. The first preset interval may be one meter.

The candidate yaw angle set (Y) is constructed as follows. In an angle range, an angle is selected as a yaw angle in the candidate yaw angle set (Y) at an interval of a second preset interval. The angle range may be a range of plus or minus fifth threshold from a yaw angle of the terminal device corresponding to the image. In other words, a central value of the second threshold range is the magnetometer angle deflection information of the terminal device. For example, the fifth threshold may be 90 degrees or 85 degrees. The second preset interval may be 0.1 degrees.

The foregoing implementations of constructing the candidate location set (T) and the candidate yaw angle set (Y) are examples for description. This is not limited in this embodiment of the present disclosure.

Step 302: Select K1 groups of candidate poses from the M groups of candidate poses, and obtain panoramic line feature information of each group of candidate poses based on candidate location information of each group of the K1 groups of candidate poses and a satellite map.

Different from matching of all candidate pose information, to shorten time consumed for matching, in this embodiment of the present disclosure, the K1 groups of candidate poses may be selected from the M groups of candidate poses for matching. A manner of selecting the K1 groups of candidate poses may be selecting the K1 groups of candidate poses at intervals from the M groups of candidate poses based on the candidate location information. For example, candidate location information of two adjacent candidate locations in the K1 groups of candidate poses is spaced by 3 meters.

Step 303: Separately match the panoramic line feature information of each group of candidate poses and two-dimensional line feature information, to determine candidate yaw angle information of each group of candidate poses.

The candidate yaw angle information of each group of candidate poses is an angle that is in a candidate yaw angle set of each group of candidate poses and that has a highest degree of matching the two-dimensional line feature information.

The panoramic line feature information of each group of candidate poses matches the two-dimensional line feature information, to determine the candidate yaw angle information of this group of candidate poses, namely, to determine a yaw angle.

In a matching process, a sliding window may be used to traverse and match panoramic line feature information of the candidate poses and the two-dimensional line feature information. The matching may include multimodal robust matching or two-dimensional contour matching. The multimodal robust matching includes multi-semantic information matching or maximum suppression matching.

Figure 8B:
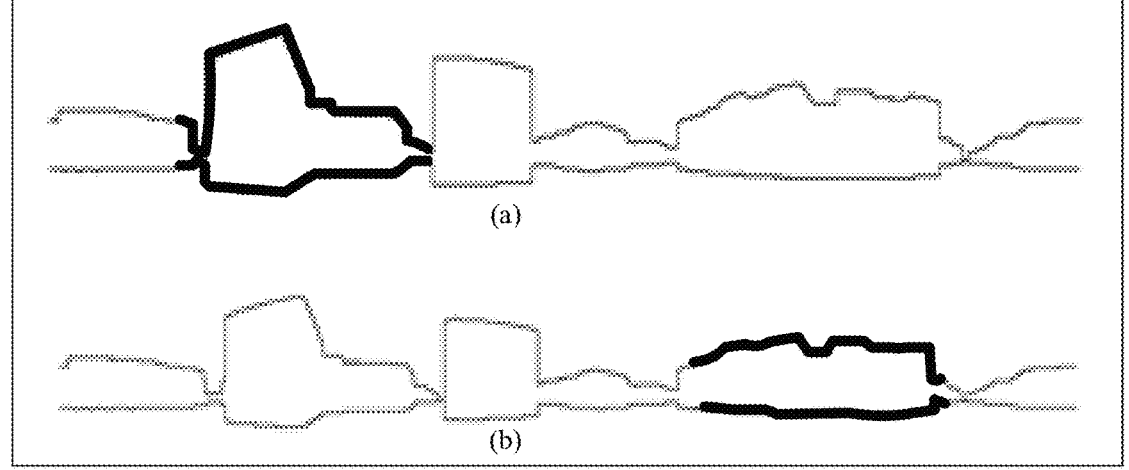
FIG. 8B is a schematic diagram of an example of dimensional contour matching according to an embodiment of the present disclosure.

For descriptions of an example of the two-dimensional contour matching, refer to FIG. 8B. (a) in FIG. 8B is a schematic diagram of a matching process of an image, namely, a process of matching panoramic line feature information (light and long lines in the figure) and two-dimensional line feature information (dark and short lines in the figure) of the image. (b) in FIG. 8B is a schematic diagram of a matching process of another image. Matching principles are the same. Details are not described herein again.

Figure 8C:
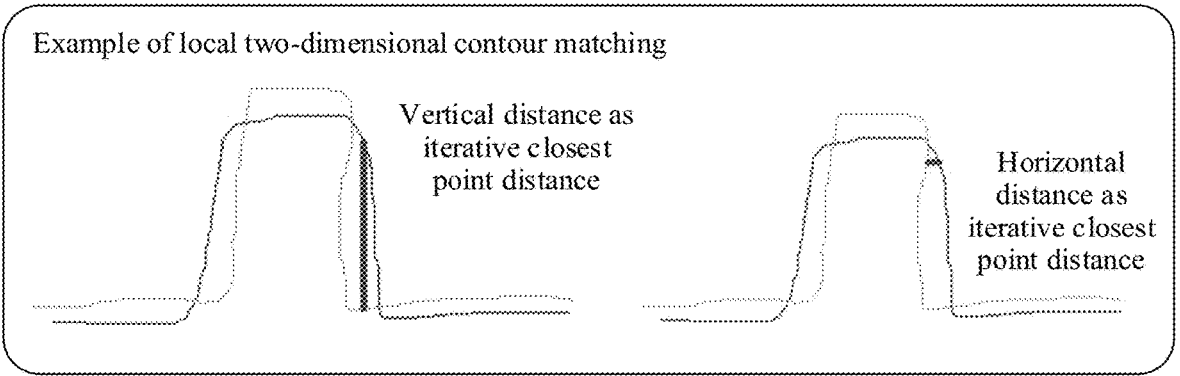
FIG. 8C is a schematic diagram of an example of local dimensional contour matching according to an embodiment of the present disclosure.

For descriptions of an example of local two-dimensional contour matching, refer to FIG. 8C. A matching example on the left side in FIG. 8C illustrates a matching manner in a conventional technology, namely, a matching manner with a vertical distance as an iterative closest point distance. There is a large error in this matching manner. A matching example on the right side in FIG. 8C illustrates a matching manner in this embodiment of the present disclosure, namely, a matching manner with a horizontal distance as an iterative closest point distance. Such a matching manner can make visual localization more accurate.

Figure 8D:
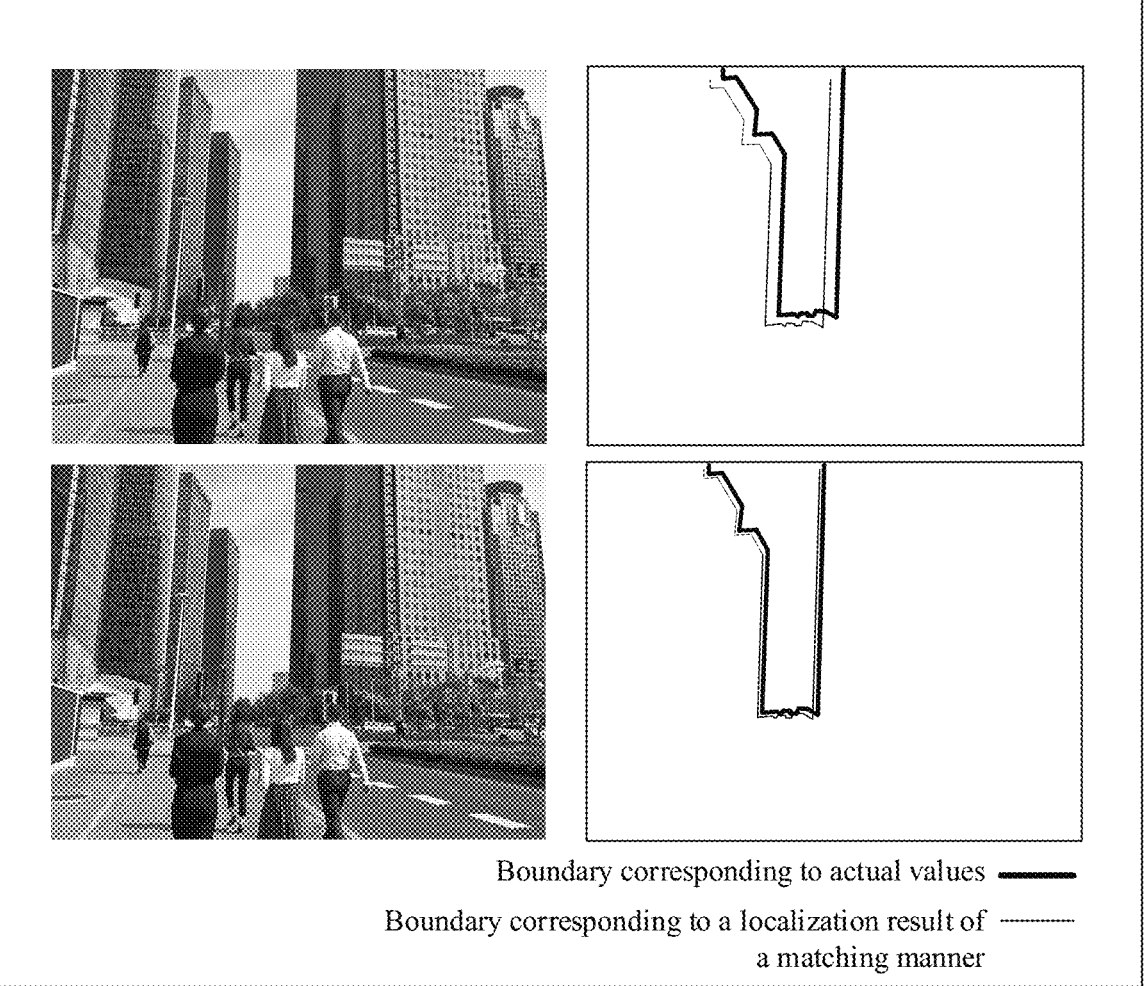
FIG. 8D is a schematic diagram of localization results of different matching manners according to an embodiment of the present disclosure.

FIG. 8C describes examples of localization results of the two different matching manners. FIG. 8D shows the localization results corresponding to the matching manners in FIG. 8C according to an embodiment of the present disclosure. The first row in FIG. 8D shows a localization result obtained after an original image on the left side in FIG. 8D is processed in the matching manner on the left side in FIG. 8C. The second row in FIG. 8D shows a localization result obtained after the original image on the left side in FIG. 8D is processed in the matching manner on the right side in FIG. 8C. It may be learned from FIG. 8D that a boundary corresponding to the localization result in the matching manner in this embodiment of the present disclosure is closer to a boundary corresponding to a ground truth.

In this embodiment of the present disclosure, matching is performed based on the information about the boundary between a building and a non-building and the information about the boundary between a non-building and a non-building, so that a localization differentiation degree can be effectively improved.

The multi-semantic information matching is described. A basic principle of the multi-semantic information matching is described by using an example in which the two-dimensional line feature information is information about a boundary between tree and sky. (1) A boundary between tree and sky in an image is higher than a boundary between building and sky in map code. (2) If an upper boundary of a building in the image exceeds an upper boundary of the image, it indicates that the upper boundary of the building is lower than the boundary between building and sky in the map code. An optimization method is as follows: If a candidate pose violates the foregoing rule in a matching process, it is considered that the candidate pose is improper.

Figure 8E:
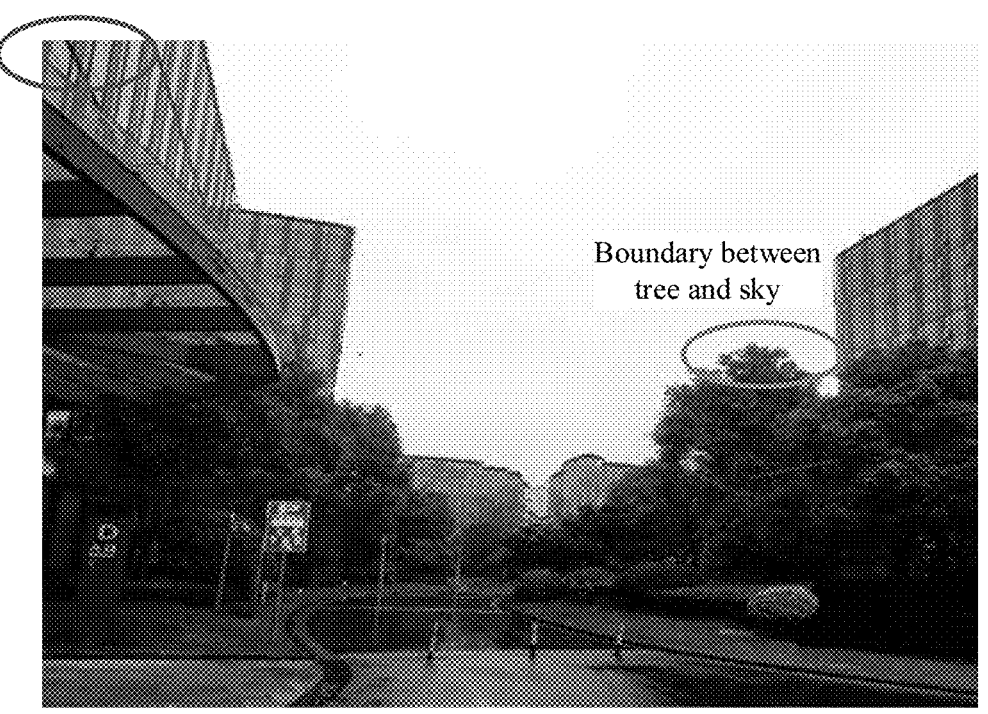
FIG. 8E is a schematic diagram of multi-semantic information matching according to an embodiment of the present disclosure.

For a schematic diagram of the multi-semantic information matching, refer to FIG. 8E. As shown in FIG. 8E, a boundary between tree and sky in an image is higher than a boundary between building and sky in map code. If an upper boundary of a building in the image exceeds an upper boundary of the image, it indicates that the upper boundary of the building in the image is lower than the boundary between building and sky in the map code.

The maximum suppression matching is described. Due to errors of white model, semantic segmentation, and the like, a large error may occur in a part (especially at the edge of a building) in a matching process. In the absence of suppression, a matching result may be affected. The optimization method is as follows: If the error of the two-dimensional line feature information exceeds a threshold, the error is suppressed to the threshold.

Step 304: Obtain K1 initial poses based on the candidate yaw angle information of the K1 groups of candidate poses, where each initial pose includes candidate location information and candidate yaw angle information of one group of candidate poses.

One group is used as an example. The candidate yaw angle information of one group of candidate poses determined in step 303 and candidate pose information of the group of candidate poses form an initial pose. For the K1 groups of candidate poses, the K1 initial poses may be obtained through matching processing.

Step 305: Optimize the K1 initial poses by using an iterative method, to obtain K1 optimized poses and an iterative closest point loss corresponding to each optimized pose.

The iterative method may be ICP optimization. In other words, ICP optimization is performed on each initial pose to obtain an optimized pose. For example, ICP optimization is performed on a yaw angle of the initial pose.

In some embodiments, each initial pose may further include preset height information, pitch angle information, and roll angle information. For example, the preset height information may be 1.5 m. The pitch angle information and the roll angle information may be provided by a simultaneous localization and mapping (SLAM) algorithm. There are some errors in the pitch angle information and the roll angle information provided by the SLAM algorithm. Therefore, the pitch angle information and the roll angle information may be further optimized through ICP optimization.

Each optimized pose includes location information, height information, magnetometer angle information (an optimized yaw angle), pitch angle information (an optimized pitch angle), and roll angle information (an optimized roll angle).

The optimization method includes extracting two-dimensional line features of an image (also referred to as a query image) and points on line features in a coding library, mapping to a unit sphere, and considering the two-dimensional line features and the points as two groups of point cloud; and then matching the two groups of point cloud through ICP optimization. The pitch angle, the yaw angle, and the roll angle are output through ICP optimization. The three angles are used as the final output angles (namely, the optimized pitch angle, the optimized yaw angle, and the optimized roll angle), instead of the angles provided by the SLAM algorithm.

Figure 8F:
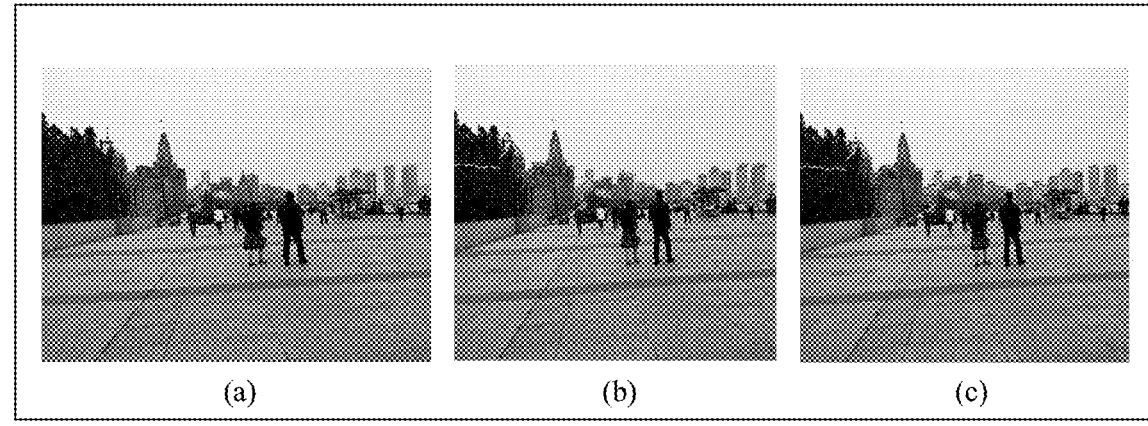
FIG. 8F is a schematic diagram of comparison between a localization pose obtained through ICP optimization and a ground truth according to an embodiment of the present disclosure.

As shown in FIG. 8F, (a) in FIG. 8F is an original image, namely, the image in the foregoing embodiment, (b) in FIG. 8F shows a boundary corresponding to a localization pose obtained without ICP optimization, which is quite different from a boundary corresponding to a ground truth based on a boundary between sky and building in (b) in FIG. 8F, and (c) in FIG. 8F shows a boundary corresponding to a localization pose obtained through ICP optimization in this embodiment of the present disclosure, which is little different from the boundary corresponding to the ground truth based on a boundary between sky and building in (c) in FIG. 8F.

Step 306: Determine one optimized pose in the K1 optimized poses as an optimized pose in the N optimized poses based on the iterative closest point loss of each optimized pose, where the one optimized pose is an optimized pose with a smallest iterative closest point loss in the K1 optimized poses.

The iterative closest point loss may be a degree of matching corresponding to an optimized pose in the loss in the embodiment shown in FIG. 4.

Step 307: Determine whether the N optimized poses are determined; and if not, replace K1 with K1+n, and repeatedly perform steps 302 to 307, or if yes, perform the following step 308.

Steps 302 to 307 are repeatedly performed until the N optimized poses are determined, where n ranges from 1 to N−1, and K1>K2=K3 . . . =KN.

In some embodiments, a center of K1+n groups of candidate poses is an optimized pose determined by performing the foregoing steps 302 to 307 on Kn groups of candidate poses. In other words, an optimized pose obtained through one search and optimization may be used to determine a plurality of groups of candidate poses for next search and optimization. For example, candidate poses around the optimized pose obtained through one search and optimization are selected for the next search and optimization.

Step 308: Determine a localization pose of the terminal device based on the N optimized poses.

For example, an optimized pose with a smallest loss in the N optimized poses is selected as the localization pose of the terminal device. The loss includes a difference between location information of the optimized pose and the location information of the terminal device, and a degree of matching corresponding to the optimized pose.

In this embodiment, visual localization may be performed based on the two-dimensional line feature information. This can resolve a problem of a localization failure or low localization accuracy in a scene in which a skyline in a field of view is short or not rich enough. This can improve a success rate and accuracy of visual localization, and can also improve visual localization robustness. The search method and the iterative closest point method can shorten localization time and improve localization accuracy.

Figure 8G:
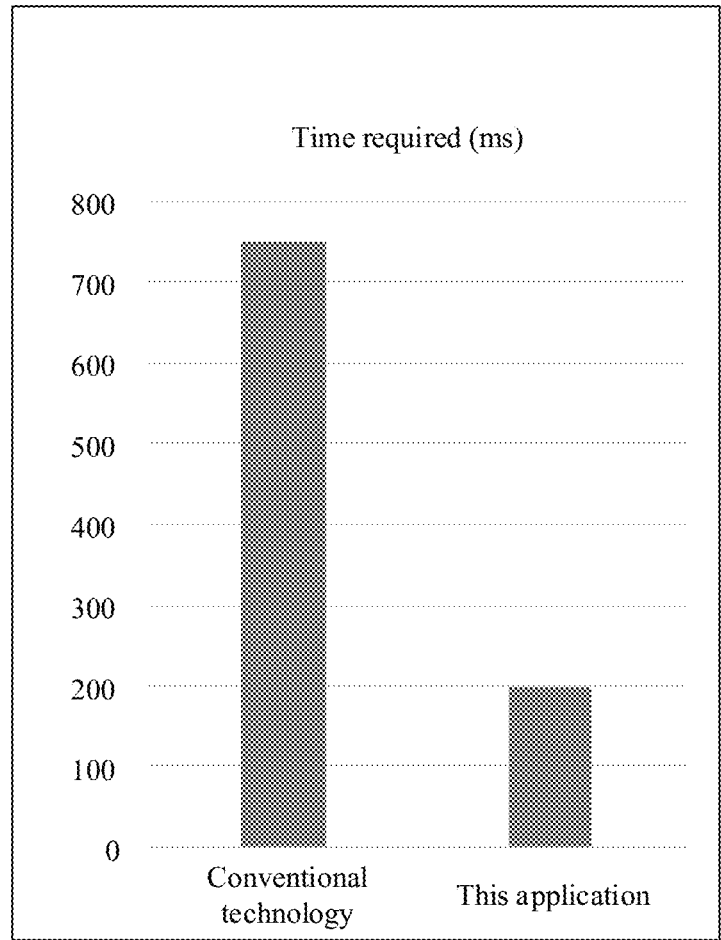
FIG. 8G is a schematic diagram of localization time of a visual localization method according to an embodiment of the present disclosure.
Figure 8H:
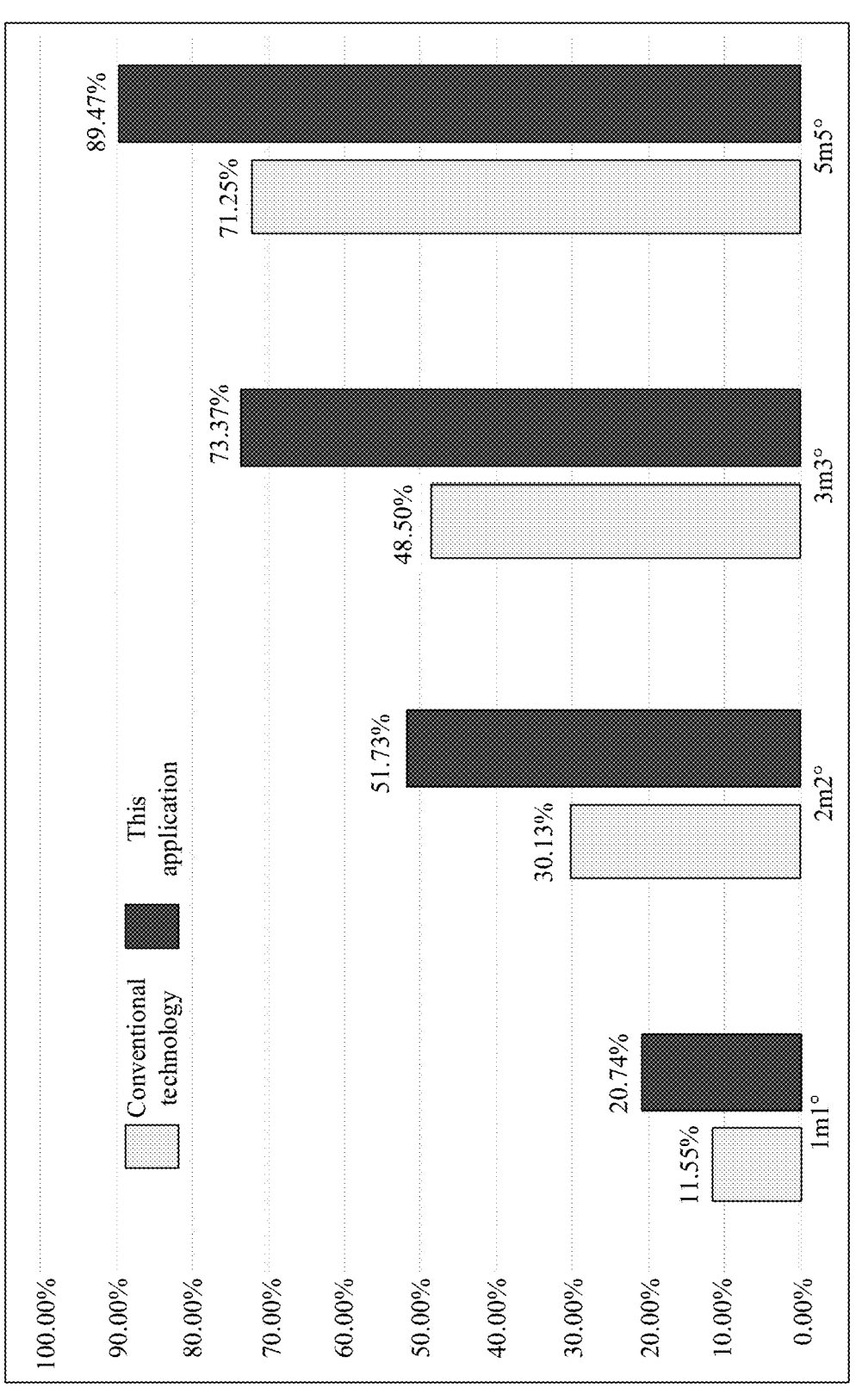
FIG. 8H is a schematic diagram of localization accuracy of a visual localization method according to an embodiment of the present disclosure.

For descriptions of effect of the visual localization method in this embodiment of the present disclosure, refer to FIG. 8G and FIG. 8H. FIG. 8G illustrates visual localization time in this embodiment of the present disclosure and localization time in the conventional technology. As shown in FIG. 8G, the visual localization method in this embodiment of the present disclosure can shorten localization time. FIG. 8H illustrates visual localization accuracy in this embodiment of the present disclosure and localization accuracy in the conventional technology. As shown in FIG. 8H, the localization accuracy in the visual localization method in this embodiment of the present disclosure is higher than the localization accuracy in the conventional technology for different localization errors, for example, 1 meter 1 degree (1 m1°) and 2 meters 2 degrees (2 m2°).

Figures 1, 9A:
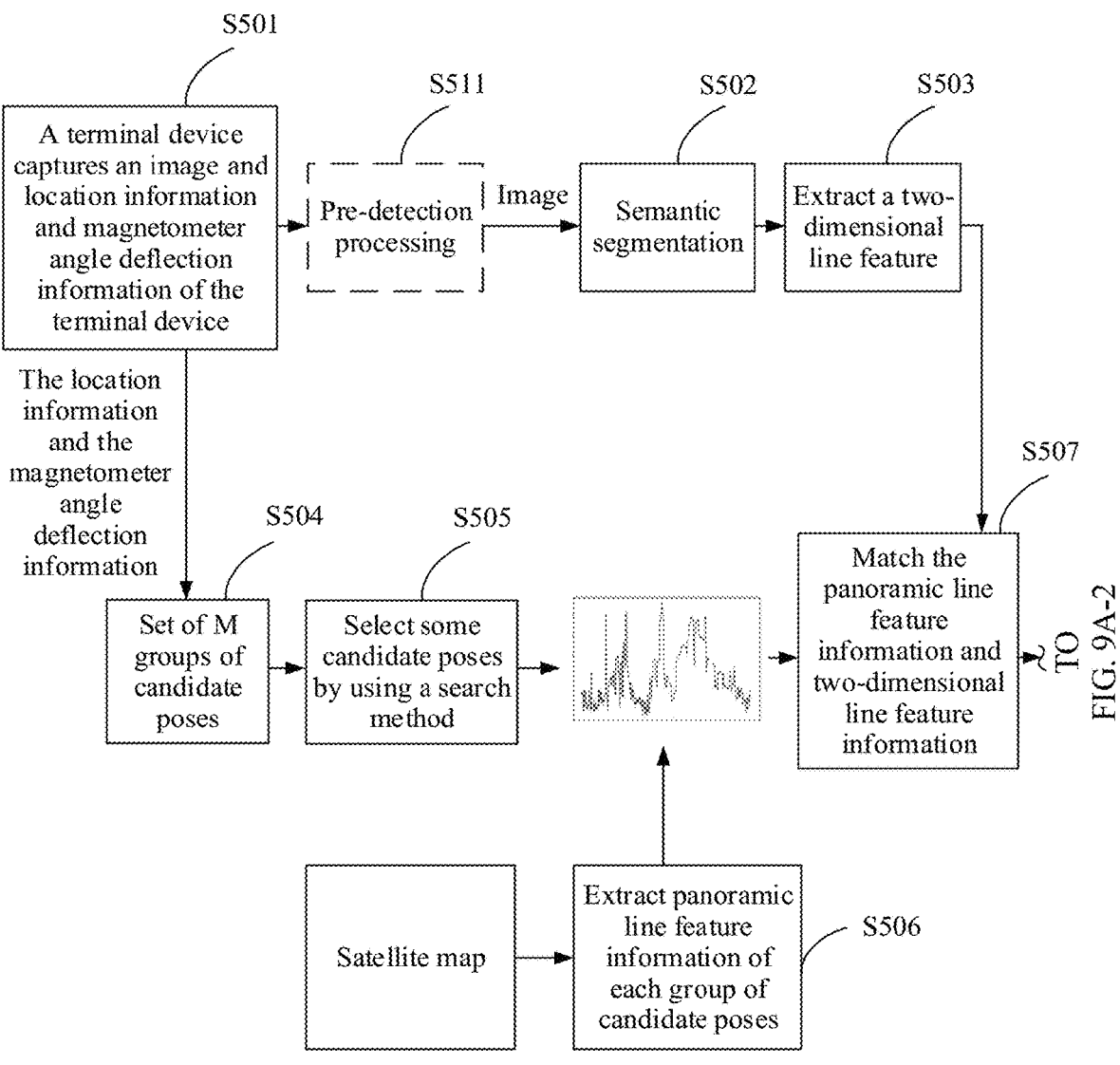
Figures 2, 9A:
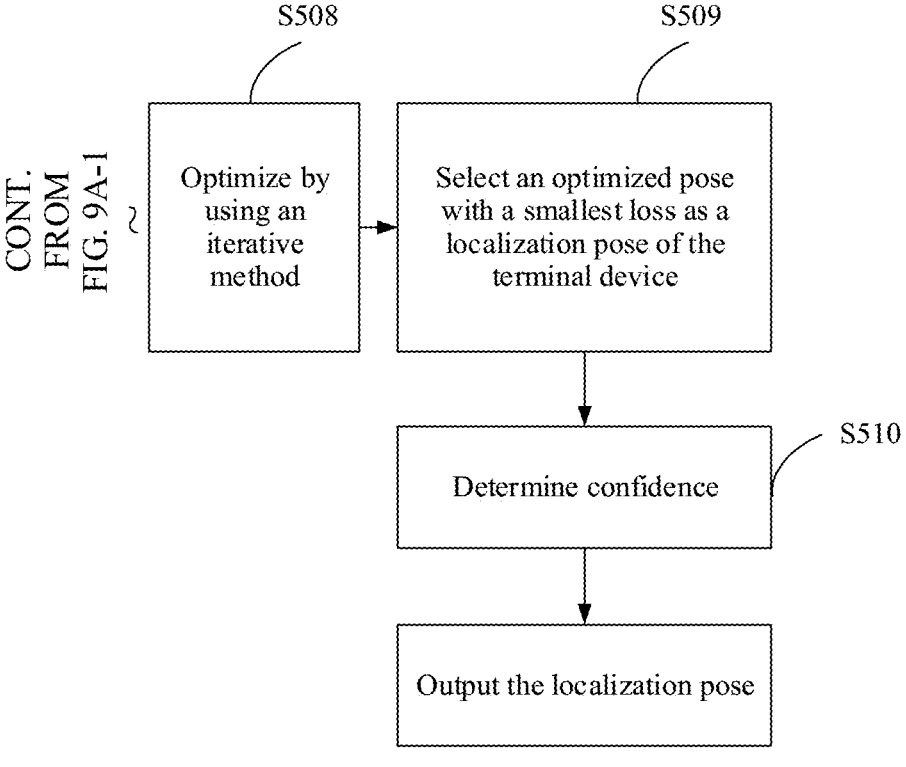

FIG. 9A-1 and FIG. 9A-2 show a schematic diagram of a processing process of a visual localization method according to an embodiment of the present disclosure. As shown in FIG. 9A-1 and FIG. 9A-2, the method in this embodiment may include a terminal device that captures an image and location information and magnetometer angle deflection information of the terminal device (S501). A server obtains the image and the location information and the magnetometer angle deflection information of the terminal device. The server performs semantic segmentation on the image (S502) to extract two-dimensional line feature information of the image based on a semantic segmentation result (S503). The server determines a set of M groups of candidate poses based on the location information and the magnetometer angle deflection information of the terminal device (S504). The server selects candidate poses from the set of M groups of candidate poses by using a search method, to perform a candidate processing step (S505). The server extracts panoramic line feature information of each group of candidate poses from a satellite map based on the candidate poses (S506). The panoramic line feature information of each group of candidate poses separately matches the two-dimensional line feature information, to determine candidate yaw angle information of each group of candidate poses and obtain a plurality of initial poses (S507). The plurality of initial poses is optimized by using an iterative method, to obtain a plurality of optimized poses (S508). An optimized pose in the plurality of optimized poses is determined as an optimized pose in the N optimized poses. Steps (S505) to (S508) are repeatedly performed to determine the N optimized poses. An optimized pose with a smallest loss in the N optimized poses is selected as a localization pose of the terminal device (S509). The server determines confidence (S510). To be specific, the server determines, based on at least one of an interior point percentage, an interior point error, or a heat map corresponding to the localization pose of the terminal device, whether the localization pose of the terminal device is reliable; and if the localization pose of the terminal device is reliable, outputs the localization pose.

For specific descriptions of the foregoing steps, refer to the descriptions of the related steps in the foregoing embodiments. Specific implementations and technical effects thereof are not described herein again.

Optionally, the visual localization method may further include the terminal device performs pre-detection processing (S511). A dashed line in FIG. 9A-1 and FIG. 9A-2 indicates optional.

An implementation of the pre-detection processing is as follows: Before the image is sent, whether the image is suitable for visual localization is determined by using a device model.

For example, the terminal device performs semantic segmentation on a current query image by using the semantic segmentation device model, extracts a two-dimensional line feature that includes the boundary between a building and a non-building and the boundary between different non-buildings, and determines richness of the two-dimensional line feature. If the two-dimensional line feature is rich, namely, if a length of the two-dimensional line feature is greater than a threshold, the image is suitable for visual localization.

Figure 9B:
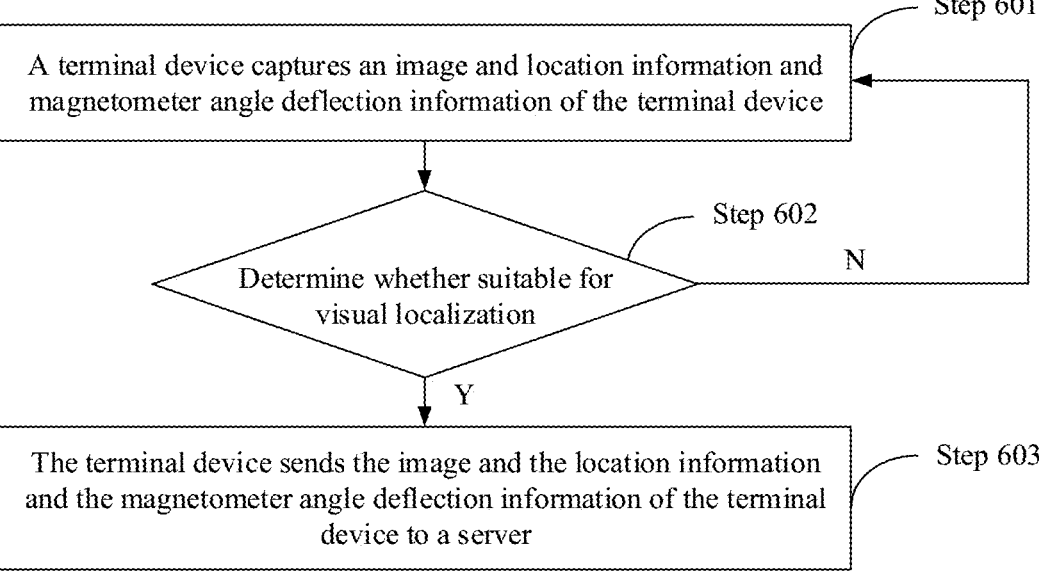
FIG. 9B is a schematic diagram of a processing process of a visual localization method according to an embodiment of the present disclosure.

For a processing process of the terminal device, refer to FIG. 9B. FIG. 9B is a schematic diagram of a processing process of a visual localization method according to an embodiment of the present disclosure. This embodiment may be performed by a terminal device or a processor of the terminal device. This embodiment may include the following steps.

Step 601: The terminal device captures an image and location information and magnetometer angle deflection information of the terminal device.

Step 602: The terminal device determines, by using a device model, whether the image is suitable for visual localization, and if yes, performs step 603, or if not, performs step 601.

Step 603: The terminal device sends the image and the location information and the magnetometer angle deflection information of the terminal device to a server.

For example, the image is input into the device model. Semantic segmentation is performed on the image by using the device model. The device model outputs a semantic segmentation result of the image. Two-dimensional line feature information of the image is obtained based on the semantic segmentation result. Whether the image is suitable for visual localization is determined based on the two-dimensional line feature information.

For example, it is determined whether at least one of a boundary between a building and a non-building or a boundary between a non-building and a non-building corresponding to the two-dimensional line feature information is rich. If the boundary is rich, it is determined that the image is suitable for visual localization. If the boundary is not rich, it is determined that the image is not suitable for visual localization.

Richness may mean that a length of the boundary is greater than a threshold. The boundary includes at least one of the boundary between a building and a non-building or the boundary between a non-building and a non-building corresponding to the two-dimensional feature information.

When it is determined that the image is suitable for visual localization, the image may be sent to the server, so that the server performs visual localization on the terminal device based on the image.

Similar to the semantic segmentation model in the foregoing embodiment, the device model in this embodiment is used to implement semantic segmentation, and output the two-dimensional line feature information of the image. For example, the device model may be any neural network model, for example, a deep neural network (Deep Neural Network, DNN), a convolutional neural network (Convolutional Neural Network, CNN), or a combination thereof. The semantic segmentation model may alternatively be any machine learning classifier, for example, a support vector machine (support vector machine, SVM) classifier.

It should be noted that accuracy of the two-dimensional line feature information of the image in the pre-detection process is different from accuracy of the two-dimensional line feature information of the image determined based on the foregoing localization pose. The server performs semantic segmentation on the image to obtain the two-dimensional line feature information of the image determined based on the localization pose. The accuracy of the two-dimensional line feature information is higher than that of the two-dimensional line feature information of the image in the pre-detection process.

The semantic segmentation model of the server performs refined semantic segmentation of different categories (vegetation, building, sky, and the like) on the query image. The semantic segmentation model herein is larger than the device model for pre-detection processing in the terminal device, and segmentation accuracy is higher than accuracy of the device model.

It should be noted that, after the terminal device sends the image to the server, the server may determine the localization pose of the terminal device through the steps in the foregoing embodiment, and return virtual object description information to the terminal device, to display a corresponding virtual object on a user interface of the terminal device.

In this implementation, the terminal device pre-detects the image, and sends the image suitable for visual localization to the server for further accurate visual localization. This can avoid a waste of transmission resources and server-side computing resources caused by sending an image unsuitable for visual localization to the server.

Figure 10:
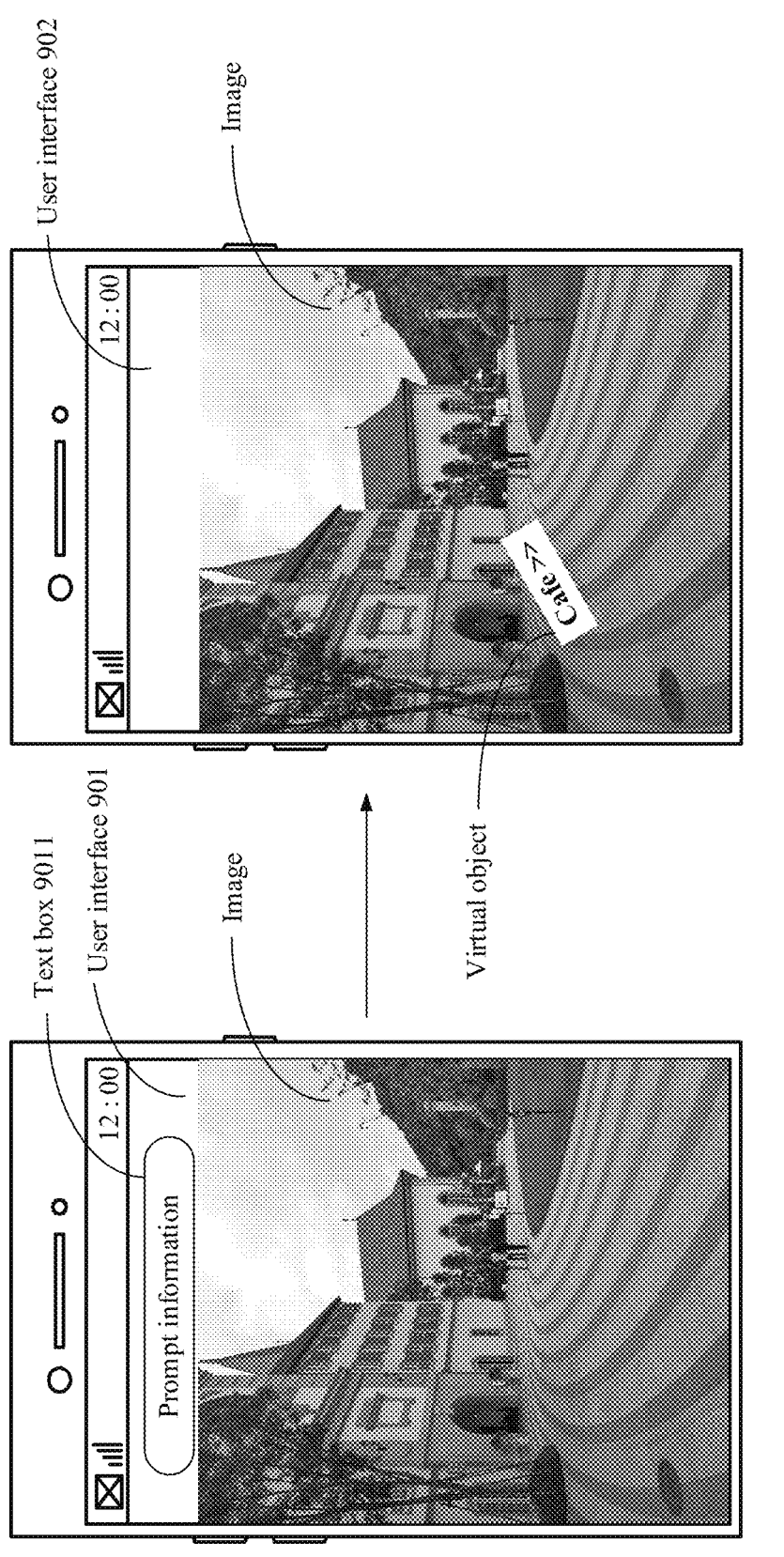
FIG. 10 is a schematic diagram of a user interface according to an embodiment of the present disclosure.

The following describes the visual localization method in the foregoing embodiment by using a specific example with reference to FIG. 10.

FIG. 10 is a schematic diagram of a user interface according to an embodiment of the present disclosure. As shown in FIG. 10, a user interface 901 and a user interface 902 are included.

As shown in the user interface 901, the terminal device may capture an image. The image is displayed on the user interface 901.

The user interface 901 may be a user interface of an application program. For example, the application program may be an application program for providing an AR navigation service. A user may tap an icon of the application program. In response to the tapping operation, the terminal device may display the user interface 901, and display the image on the user interface 901.

Optionally, prompt information (a text box 9011 shown in FIG. 10) may be further displayed on the user interface 901. The prompt information is used to prompt the user to photograph at least one of a boundary between a building and a non-building or a boundary between a non-building and a non-building. For example, the prompt information may be "Please photograph a scene as rich as possible: a boundary between vegetation and building, a boundary between road and building, and the like".

The image on the user interface 901 includes a boundary between building and vegetation, a boundary between vegetation and road, a boundary between building and road, a boundary between building and sky, and a boundary between vegetation and sky. Therefore, a visual localization requirement can be met. The terminal device may send the image to the server through the foregoing step 102. The server may determine the localization pose of the terminal device through the foregoing steps 103 to 104, and send the virtual object description information corresponding to the localization pose to the terminal device through step 105. The terminal device may display the user interface 902 based on the virtual object description information. The user interface 902 displays a virtual object corresponding to the virtual object description information, for example, a guide icon of a cafe.

In this embodiment, visual localization may be performed based on the two-dimensional line feature information. This can resolve a problem of a localization failure or low localization accuracy in a scene in which a skyline in a field of view is short or not rich enough. This can improve a success rate and accuracy of visual localization, and can also improve visual localization robustness. The search method and the iterative closest point method can shorten localization time and improve localization accuracy. In addition, the virtual object description information is pushed to the terminal device based on the localization pose, so that the terminal device displays, on the user interface, the virtual object corresponding to the virtual object description information. Therefore, the visual localization method in this embodiment of the present disclosure may be applied to fields in which a location and a pose of a camera of the terminal device need to be determined, such as AR navigation, AR human-computer interaction, assisted driving, and self-driving. This improves user experience.

Figure 11:
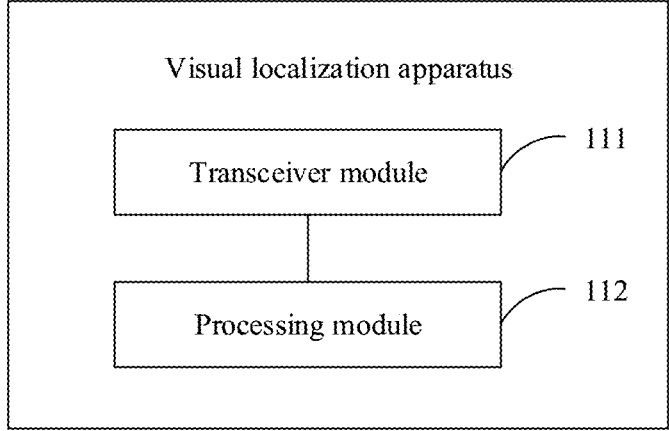
FIG. 11 is a schematic diagram of a structure of a visual localization apparatus according to an embodiment of the present disclosure.

An embodiment of the present disclosure further provides a visual localization apparatus, configured to perform the method steps performed by the server or the processor of the server in the foregoing method embodiments. As shown in FIG. 11, the visual localization apparatus may include a transceiver module 111 and a processing module 112.

The processing module 112 is configured to obtain, by using the transceiver module 111, an image captured by a terminal device. The processing module 112 is further configured to obtain two-dimensional line feature information of the image based on the image, where the two-dimensional line feature information includes at least one of information about a boundary between a building and a non-building or information about a boundary between a non-building and a non-building. The processing module 112 is further configured to determine a localization pose of the terminal device based on location information and magnetometer angle deflection information of the terminal device, a satellite map, and the two-dimensional line feature information.

In some embodiments, the processing module 112 is configured to perform semantic segmentation on the image to extract the two-dimensional line feature information of the image.

In some embodiments, the processing module 112 is configured to: determine a candidate pose set based on location information and magnetometer angle deflection information of the terminal device; determine N optimized poses based on the candidate pose set, the two-dimensional line feature information, and the satellite map; and determine the localization pose of the terminal device based on the N optimized poses. N is an integer greater than 1.

In some embodiments, the processing module 112 is configured to: select candidate poses from the candidate pose set, determine panoramic line feature information corresponding to the candidate poses based on the candidate poses and the satellite map, and match the panoramic line feature information and the two-dimensional line feature information to determine a plurality of initial poses. The iterative method is used to optimize the plurality of initial poses to determine the N optimized poses.

In some embodiments, the candidate pose set includes M groups of candidate poses. Each group of candidate poses includes candidate location information and a candidate yaw angle set. The candidate location information belongs to a first threshold range. The first threshold range is determined based on the location information of the terminal device. The candidate yaw angle set belongs to a second threshold range. The second threshold range is an angle set determined based on the magnetometer angle deflection information of the terminal device. The processing module is configured to:

Step 1: select K1 groups of candidate poses from the M groups of candidate poses, and obtain panoramic line feature information of each group of candidate poses based on candidate location information of each group of the K1 groups of candidate poses and the satellite map;

Step 2: separately match the panoramic line feature information of each group of candidate poses and the two-dimensional line feature information, to determine candidate yaw angle information of each group of candidate poses, where the candidate yaw angle information of each group of candidate poses is an angle that is in a candidate yaw angle set of each group of candidate poses and that has a highest degree of matching the two-dimensional line feature information;

Step 3: obtain K1 initial poses based on the candidate yaw angle information of the K1 groups of candidate poses, where each initial pose includes candidate location information and candidate yaw angle information of one group of candidate poses;

Step 4: optimize the K1 initial poses by using the iterative method, to obtain K1 optimized poses and an iterative closest point loss corresponding to each optimized pose;

Step 5: determine one optimized pose in the K1 optimized poses as an optimized pose in the N optimized poses based on the iterative closest point loss of each optimized pose, where the one optimized pose is an optimized pose with a smallest iterative closest point loss in the K1 optimized poses; and Step 6: replace K1 with K1+n, and repeatedly perform steps 1 to 5 until the N optimized poses are determined, where n ranges from 1 to N−1, and K1>K2=K3 . . . = KN.

In some embodiments, a center of K1+n groups of candidate poses is an optimized pose determined by performing the foregoing steps 1 to 5 on Kn groups of candidate poses.

In some embodiments, each initial pose further includes preset height information, preset pitch angle information, and preset roll angle information. Each optimized pose includes location information, height information, yaw angle information, pitch angle information, and roll angle information.

In some embodiments, the matching includes multimodal robust matching or two-dimensional contour matching. The multimodal robust matching includes multi-semantic information matching or maximum suppression matching.

In some embodiments, the processing module 112 is configured to select an optimized pose with a smallest loss in the N optimized poses as the localization pose of the terminal device. The loss is a weighted sum of a difference corresponding to each optimized pose and the iterative closest point loss of each optimized pose. The difference is a difference between the location information of each optimized pose and the location information of the terminal device.

In some embodiments, the processing module 112 is further configured to: determine, based on at least one of an interior point percentage, an interior point error, or a heat map corresponding to the localization pose of the terminal device, whether the localization pose of the terminal device is reliable; and if the localization pose of the terminal device is reliable, output the localization pose of the terminal device, or if the localization pose of the terminal device is unreliable, determine that localization fails. The heat map indicates distribution of the candidate poses.

In some embodiments, the processing module 112 is configured to: determine whether the localization pose of the terminal device meets at least one of the following conditions: the interior point percentage corresponding to the localization pose of the terminal device is greater than a first threshold; the interior point error corresponding to the localization pose of the terminal device is less than a second threshold; or a distribution density of the candidate poses in the heat map corresponding to the localization pose of the terminal device is greater than a third threshold.

In some embodiments, the processing module 112 is further configured to: determine virtual object description information based on the localization pose of the terminal device; and send the virtual object description information to the terminal device by using the transceiver module 111, where the virtual object description information is used for displaying a corresponding virtual object on the terminal device.

The visual localization apparatus provided in this embodiment of the present disclosure may be configured to perform the foregoing visual localization method. For content and effects of the visual localization apparatus, refer to the method part.

Figure 12:
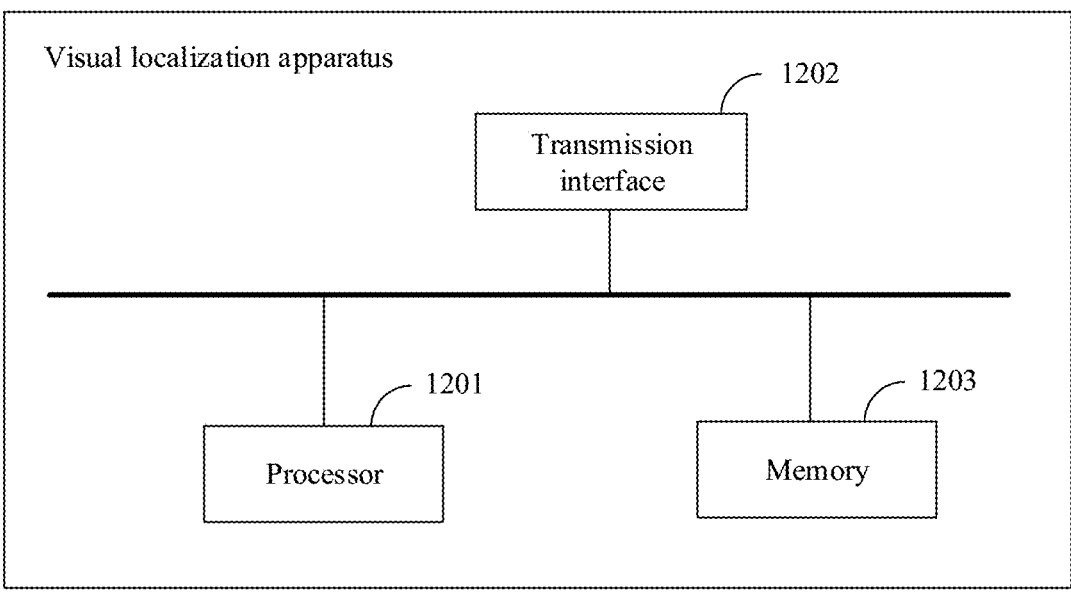
FIG. 12 is a schematic diagram of a structure of another visual localization apparatus according to an embodiment of the present disclosure.

An embodiment of the present disclosure further provides a visual localization apparatus. As shown in FIG. 12, the visual localization apparatus includes a processor 1201 and a transmission interface 1202. The transmission interface 1202 is configured to obtain an image captured by a terminal device.

The transmission interface 1202 may include a transmit interface and a receive interface. For example, the transmission interface 1202 may be any type of interface according to any proprietary or standardized interface protocol, for example, a high-definition multimedia interface (HDMI), a mobile industry processor interface (MIPI), an MIPI-standardized display serial interface (DSI), a video electronics standards association (VESA)-standardized embedded display port (eDP), a display port (DP), or a V-By-One interface. The V-By-One interface is a digital interface standard developed for image transmission. The transmission interface 1202 may also include any wired or wireless interface, an optical interface, or the like.

The processor 1201 is configured to invoke program instructions stored in a memory, to perform the visual localization method in the foregoing method embodiments. For content and effects of the visual localization method, refer to the method part. Optionally, the apparatus further includes a memory 1203. The processor 1201 may be a single-core processor or a multi-core processor group. The transmission interface 1202 is an interface for receiving or sending data. Data processed by the visual localization apparatus may include audio data, video data, or image data. For example, the visual localization apparatus may be a processor chip.

Some other embodiments of the present disclosure further provide a computer storage medium. The computer storage medium may include computer instructions. When the computer instructions are run on an electronic device, the electronic device is enabled to perform the steps performed by the server in the foregoing method embodiments.

Some other embodiments of the present disclosure further provide a computer program product. When the computer program product runs on a computer, the computer is enabled to perform the steps performed by the server in the foregoing method embodiments.

Some other embodiments of the present disclosure further provide an apparatus. The apparatus has a function of implementing behaviors of the server in the foregoing method embodiments. The function may be implemented by hardware, or may be implemented by hardware executing corresponding software. The hardware or the software includes one or more modules corresponding to the foregoing functions, for example, an obtaining unit or module and a determining unit or module.

Figure 13:
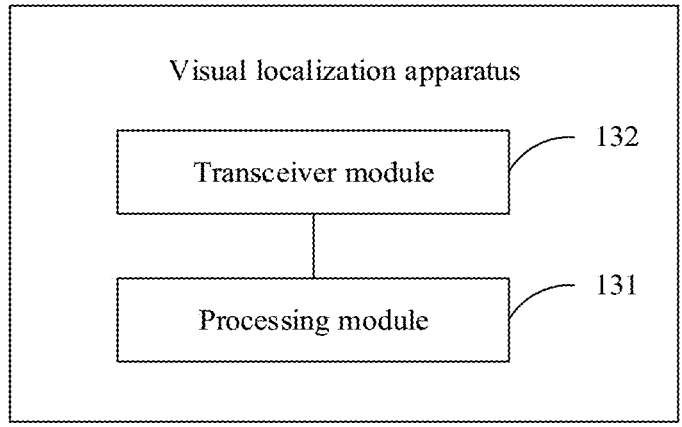
FIG. 13 is a schematic diagram of a structure of another visual localization apparatus according to an embodiment of the present disclosure.

An embodiment of the present disclosure further provides a visual localization apparatus, configured to perform the method steps performed by the terminal device or the processor of the terminal device in the foregoing method embodiments. As shown in FIG. 13, the visual localization apparatus may include a processing module 131 and a transceiver module 132.

The processing module 131 is configured to capture an image, and display the image on a user interface, where the image includes at least one of a boundary between a non-building and a non-building that are photographed or a boundary between a building and a non-building that are photographed. The processing module 131 is further configured to send the image to a server by using the transceiver module 132. The transceiver module 132 is further configured to receive virtual object description information sent by the server, where the virtual object description information is determined based on a localization pose of the terminal device that captures the image, the localization pose is determined based on at least two-dimensional line feature information of the image and location information of the terminal device, and the two-dimensional line feature information includes at least one of information about the boundary between a building and a non-building or information about the boundary between a non-building and a non-building. The processing module 131 is further configured to superimpose and display, on the user interface, a virtual object corresponding to the virtual object description information.

In some embodiments, before capturing the image, the processing module 131 is further configured to display prompt information on the user interface, where the prompt information prompts a user to photograph at least one of the boundary between a building and a non-building or the boundary between a non-building and a non-building.

In some embodiments, before sending the image, the processing module 131 is further configured to determine, by using a device model, whether the image is suitable for visual localization.

The visual localization apparatus provided in this embodiment of the present disclosure may be configured to perform the foregoing visual localization method. For content and effects of the visual localization apparatus, refer to the method part.

Figure 14:
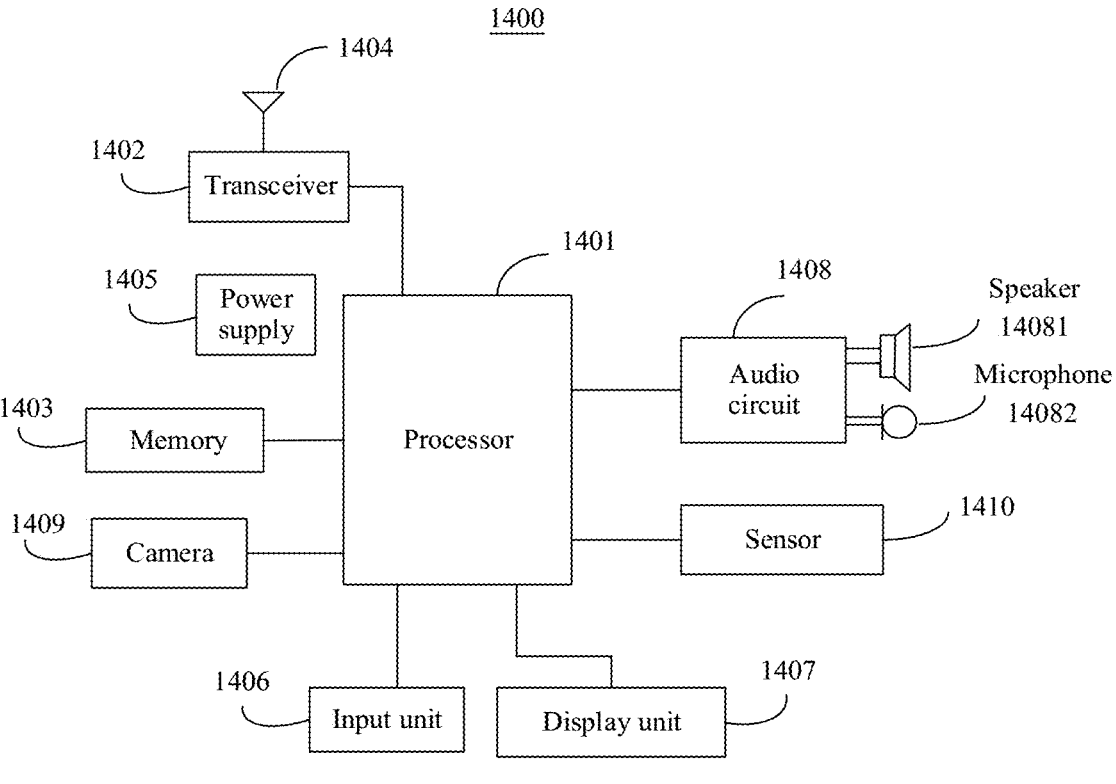
FIG. 14 is a schematic diagram of a structure of another visual localization apparatus according to an embodiment of the present disclosure.

FIG. 14 is a schematic diagram of a structure of a visual processing apparatus according to an embodiment of the present disclosure. As shown in FIG. 14, the visual processing apparatus 1400 may be the terminal device in the foregoing embodiments. The visual processing apparatus 1400 includes a processor 1401 and a transceiver 1402.

Optionally, the visual processing apparatus 1400 further includes a memory 1403. The processor 1401, the transceiver 1402, and the memory 1403 may communicate with each other through an internal connection path, to transfer a control signal and/or a data signal.

The memory 1403 is configured to store a computer program. The processor 1401 is configured to execute the computer program stored in the memory 1403, to implement the functions in the foregoing apparatus embodiment.

Optionally, the memory 1403 may alternatively be integrated into the processor 1401, or may be independent of the processor 1401.

Optionally, the visual processing apparatus 1400 may further include an antenna 1404, configured to transmit a signal output by the transceiver 1402. Alternatively, the transceiver 1402 receives a signal through the antenna.

Optionally, the visual processing apparatus 1400 may further include a power supply 1405, configured to supply power to various components or circuits in the terminal device.

In addition, to improve functions of the terminal device, the visual processing apparatus 1400 may further include one or more of an input unit 1406, a display unit 1407 (which may also be considered as an output unit), an audio circuit 1408, a camera lens 1409, a sensor 1410, and the like. The audio circuit may further include a speaker 14081, a microphone 14082, and the like. Details are not described again.

Some other embodiments of the present disclosure further provide a computer storage medium. The computer storage medium may include computer instructions. When the computer instructions are run on an electronic device, the electronic device is enabled to perform the steps performed by the terminal device in the foregoing method embodiments.

Some other embodiments of the present disclosure further provide a computer program product. When the computer program product runs on a computer, the computer is enabled to perform the steps performed by the terminal device in the foregoing method embodiments.

Some other embodiments of the present disclosure further provide an apparatus. The apparatus has a function of implementing behaviors of the terminal device in the foregoing method embodiments. The function may be implemented by hardware, or may be implemented by hardware executing corresponding software. The hardware or the software includes one or more modules corresponding to the foregoing functions, for example, a capture unit or module, a sending unit or module, and a display unit or module.

The processor mentioned in the foregoing embodiments may be an integrated circuit chip, and has a signal processing capability. In an implementation process, the steps in the foregoing method embodiments can be implemented by a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor, or the like. The steps of the methods disclosed in embodiments of the present disclosure may be directly presented as being performed and completed by a hardware encoding processor, or performed and completed by a combination of hardware and a software module in an encoding processor. The software module may be located in a storage medium mature in the art, such as a random-access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in the foregoing embodiments may be a volatile memory or a nonvolatile memory, or may include both a volatile memory and a nonvolatile memory. The non-volatile memory may be a read-only memory (ROM), a programmable ROM (PROM), an erasable PROM (EPROM), an electrically EPROM (EEPROM), or a flash memory. The volatile memory may be a random-access memory (RAM) used as an external cache. Through example but not limitative description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a SynchLink DRAM (SLDRAM), and a direct Rambus DRAM (DR DRAM). It should be noted that the memory of the systems and methods described in this specification includes but is not limited to these and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in the present disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of the present disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the conventional technology, or some of the technical solutions may be implemented in a form of a software product. The computer software product is stored in a storage medium, and includes several instructions to enable a computer device (which may be a personal computer, a server, a network device, or the like) to perform all or some of the steps of the method described in embodiments of the present disclosure. The foregoing storage medium includes various media that can store program code, such as a Universal Serial Bus (USB) flash drive, a removable hard disk, a ROM, a RAM, a magnetic disk, or an optical disc.

What is claimed is:

1. A visual localization method implemented by a server, the visual localization method comprising:
   obtaining an image from a terminal device;
   obtaining two-dimensional line feature information of the image, the two-dimensional line feature information comprising at least one of first boundary information about a first boundary between a building and a first non-building, or second boundary information about a second boundary between a second non-building and a third non-building;
   determining a candidate pose set based on first location information of the terminal device and magnetometer angle deflection information of the terminal device;
   determining N optimized poses based on the candidate pose set, the two-dimensional line feature information, and a satellite map, wherein N is an integer greater than 1; and
   determining a localization pose of the terminal device based on the N optimized poses.

2. The visual localization method of claim 1, wherein obtaining the two-dimensional line feature information comprises performing semantic segmentation on the image to extract the two-dimensional line feature information.

3. The visual localization method of claim 1, wherein candidate pose set comprises M groups of candidate poses, wherein each group of candidate poses comprises candidate location information and a candidate yaw angle set, wherein the candidate location information is within a first threshold range based on the first location information, wherein the candidate yaw angle set is within a second threshold range based on the magnetometer angle deflection information, and wherein M is an integer greater than 1.

4. The visual localization method of claim 3, wherein determining the N optimized poses comprises:
   step 1: selecting $K_1$ groups of candidate poses from the M groups of candidate poses and obtaining panoramic line feature information of each group of the $K_1$ groups of candidate poses based on candidate location information of each group of the $K_1$ groups of candidate poses and the satellite map;
   step 2: separately matching the panoramic line feature information of each group of the $K_1$ groups of candidate poses and the two-dimensional line feature information to determine candidate yaw angle information of each group of the $K_1$ groups of candidate poses, wherein the candidate yaw angle information of each group of the $K_1$ groups of candidate poses is an angle that is in a candidate yaw angle set of each group of the $K_1$ groups of candidate poses and that has a highest degree of matching the two-dimensional line feature information;
   step 3: obtaining $K_1$ initial poses based on the candidate yaw angle information of the $K_1$ groups of candidate poses, wherein each $K_1$ initial pose comprises the candidate location information and the candidate yaw angle information of one group of the $K_1$ groups of candidate poses;
   step 4: optimizing the $K_1$ initial poses by using an iterative visual localization method to obtain $K_1$ optimized poses and an iterative closest point loss corresponding to each optimized pose;
   step 5: determining one optimized pose in the $K_1$ optimized poses as a first optimized pose in the N optimized poses based on the iterative closest point loss of each optimized poses, wherein the one optimized pose has a smallest iterative closest point loss in the $K_1$ optimized poses; and step 6: replacing $K_1$ with $K_{1+n}$, and repeatedly performing steps 1 to 5 until the N optimized poses are determined, wherein n ranges from 1 to N–1, and $K_1 > K_2 = K_3 \ldots = K_N$.

5. The visual localization method of claim 4, wherein a center of $K_{1+n}$ groups of candidate poses is a second optimized pose determined by performing the steps 1 to 5 on $K_n$ groups of candidate poses.

6. The visual localization method of claim 1, wherein determining the N optimized poses comprises:

selecting candidate poses from the candidate pose set;

determining panoramic line feature information corresponding to the candidate poses based on the candidate poses and the satellite map;

matching the panoramic line feature information and the two-dimensional line feature information to determine a plurality of initial poses; and optimizing the plurality of initial poses to determine the N optimized poses.

7. The visual localization method of claim 6, wherein each initial pose further comprises preset height information, preset pitch angle information, and preset roll angle information, and wherein each optimized pose comprises the first location information, height information, yaw angle information, pitch angle information, and roll angle information.

8. The visual localization method of claim 6, wherein matching the panoramic line feature information and the two-dimensional line feature information comprises multimodal robust matching or two-dimensional contour matching, wherein the multimodal robust matching comprises multi-semantic information matching or maximum suppression matching.

9. The visual localization method of claim 6, further comprising:

determining whether the localization pose of the terminal device is reliable based on at least one of an interior point percentage, an interior point error, or a heat map corresponding to the localization pose, wherein the heat map indicates distribution of the candidate poses; and outputting the localization pose of the terminal device when the localization pose of the terminal device is reliable, or determining that localization fails when the localization pose of the terminal device is unreliable.

10. The visual localization method of claim 9, wherein the localization pose is reliable when:

the interior point percentage corresponding to the localization pose is greater than a first threshold;

the interior point error corresponding to the localization pose is less than a second threshold; or a distribution density of the candidate poses in the heat map corresponding to the localization pose is greater than a third threshold.

11. The visual localization method of claim 1, wherein determining the localization pose comprises selecting an optimized pose with a smallest loss in the N optimized poses as the localization pose, wherein a loss is a weighted sum of an iterative closest point loss of each optimized pose in the N optimized poses and a difference corresponding to each optimized pose, and wherein the difference is between a second location information of each optimized pose and the first location information of the terminal device.

12. The visual localization method of claim 1, further comprising:

determining virtual object description information based on the localization; and sending the virtual object description information to the terminal device, wherein the virtual object description information comprises information for displaying a corresponding virtual object on the terminal device.

13. A visual localization apparatus comprising:

a memory configured to store instructions; and a processor coupled to the memory and configured to execute the instructions to cause the visual localization apparatus to:

obtain an image captured by a terminal device;

obtain two-dimensional line feature information of the image, the two-dimensional line feature information comprising at least one of first boundary information about a first boundary between a building and a first non-building, or second boundary information about a second boundary between a second non-building and a third non-building;

determine a candidate pose set based on first location information of the terminal device and magnetometer angle deflection information of the terminal device;

determine N optimized poses based on the candidate pose set, the two-dimensional line feature information, and a satellite map, wherein N is an integer greater than 1; and determine a localization pose of the terminal device based on the N optimized poses.

14. The visual localization apparatus of claim 13, wherein the processor is further configured to execute the instructions to cause the visual localization apparatus to perform semantic segmentation on the image to extract the two-dimensional line feature information.

15. A computer program product comprising computer-executable instructions that are stored on a non-transitory computer storage medium and that, when executed by a processor, cause a visual localization apparatus to:

obtain an image captured by a terminal device;

obtain two-dimensional line feature information of the image, the two-dimensional line feature information comprising at least one of first boundary information about a first boundary between a building and a first non-building, or second boundary information about a second boundary between a second non-building and a third non-building;

determine a candidate pose set based on first location information of the terminal device and magnetometer angle deflection information of the terminal device;

determine N optimized poses based on the candidate pose set, the two-dimensional line feature information, and a satellite map, wherein N is an integer greater than 1; and determine a localization pose of the terminal device based on the N optimized poses.

16. The computer program product of claim 15, wherein when executed by the processor, the computer-executable instructions further cause the visual localization apparatus to perform semantic segmentation on the image to extract the two-dimensional line feature information.

17. The computer program product of claim 15, wherein the candidate pose set comprises M groups of candidate poses, wherein each group of candidate poses comprises candidate location information and a candidate yaw angle set, wherein the candidate location information is within a first threshold range based on the first location information, wherein the candidate yaw angle set is within a second threshold range based on the magnetometer angle deflection information, and wherein M is an integer greater than 1.

18. The computer program product of claim 15, wherein to determine the N optimized poses, when executed by the processor, the computer-executable instructions further cause the visual localization apparatus to:

select candidate poses from the candidate pose set;

determine panoramic line feature information corresponding to the candidate poses based on the candidate poses and the satellite map;

match the panoramic line feature information and the two-dimensional line feature information to determine a plurality of initial poses; and optimize the plurality of initial poses to determine the N optimized poses.

19. The computer program product of claim 15, wherein to determine the localization pose, when executed by the processor, the computer-executable instructions further cause the visual localization apparatus to select an optimized pose with a smallest loss in the N optimized poses as the localization pose, wherein a loss is a weighted sum of an iterative closest point loss of each optimized pose in the N optimized poses and a difference corresponding to each optimized pose, and wherein the difference is between a second location information of each optimized pose and the first location information of the terminal device.

* * * * *